(12) United States Patent
Prvulovic et al.

(10) Patent No.: US 12,189,760 B2
(45) Date of Patent: Jan. 7, 2025

(54) SYSTEM AND METHOD FOR DETECTING HARDWARE TROJAN CIRCUITS

(71) Applicant: GEORGIA TECH RESEARCH CORPORATION, Atlanta, GA (US)

(72) Inventors: Milos Prvulovic, Atlanta, GA (US); Chia-Lin Cheng, Atlanta, GA (US); Luong N. Nguyen, Atlanta, GA (US); Alenka Zajic, Atlanta, GA (US)

(73) Assignee: GEORGIA TECH RESEARCH CORPORATION, Atlanta, GA (US)

(*) Notice: Subject to any disclaimer, the term of this patent is extended or adjusted under 35 U.S.C. 154(b) by 268 days.

(21) Appl. No.: 16/973,512

(22) PCT Filed: Jan. 16, 2020

(86) PCT No.: PCT/US2020/013836
§ 371 (c)(1),
(2) Date: Dec. 9, 2020

(87) PCT Pub. No.: WO2020/150448
PCT Pub. Date: Jul. 23, 2020

(65) Prior Publication Data
US 2021/0342443 A1   Nov. 4, 2021

Related U.S. Application Data

(60) Provisional application No. 62/793,059, filed on Jan. 16, 2019.

(51) Int. Cl.
*G06F 21/55* (2013.01)
*G06F 21/44* (2013.01)
(Continued)

(52) U.S. Cl.
CPC ............ *G06F 21/554* (2013.01); *G06F 21/44* (2013.01); *G06F 21/556* (2013.01);
(Continued)

(58) Field of Classification Search
CPC .. G06F 2221/034; G06F 21/566; G06F 21/56; G06F 21/577; G06F 21/567; G06F 21/72; G06F 21/75; H04L 63/1425
See application file for complete search history.

(56) References Cited

U.S. PATENT DOCUMENTS 9,411,993 B2   8/2016  Jonely
2011/0175624 A1   7/2011  Wong
(Continued)

OTHER PUBLICATIONS

K. Xiao, D. Forte, Y. Jin, R. Karri, S. Bhunia, and M. Tehranipoor, "Hardware Trojans: Lessons learned after one decade of research," ACM Transactions on Design Automation of Electronic Systems (TODAES), vol. 22, No. I, p. 6, 2016.
(Continued)

*Primary Examiner* — Hitesh Patel
(74) *Attorney, Agent, or Firm* — Meunier Carlin & Curfman LLC

(57) ABSTRACT

A system for detecting hardware Trojans in a computerized device includes a digital circuit having switching components operating pursuant to at least one clock frequency and positioned within an interrogation range of an incident carrier wave. A modulated backscatter response is reflected from the digital circuit upon arrival of the incident carrier wave in the presence of the switching operations. A detection device is positioned to receive the modulated backscatter response. A computer connected to the detection device identifies harmonics of a respective clock frequency of the digital circuit from the backscatter response and identifies characteristics of the harmonics indicating a presence or an absence of a hardware Trojan connected to the digital circuit.

14 Claims, 32 Drawing Sheets

(51) Int. Cl.
*G06F 21/56* (2013.01)
*G06F 21/76* (2013.01)
*G06F 30/398* (2020.01)

(52) U.S. Cl.
CPC ............ *G06F 21/566* (2013.01); *G06F 21/76* (2013.01); *G06F 30/398* (2020.01)

(56) References Cited

U.S. PATENT DOCUMENTS

| | | | |
|---|---|---|---|
| 2015/0084771 A1* | 3/2015 | Nikitin | G06K 7/10237 340/10.4 |
| 2016/0342791 A1 | 11/2016 | Aguayo Gonzalez et al. | |
| 2016/0342820 A1 | 11/2016 | Jonely | |
| 2016/0365890 A1* | 12/2016 | Reynolds | H04B 1/10 |
| 2017/0161485 A1 | 6/2017 | Aguayo Gonzalez et al. | |
| 2017/0373892 A1* | 12/2017 | Ganesan | H04B 17/318 |
| 2019/0354681 A1* | 11/2019 | Hauser | G06F 21/81 |

OTHER PUBLICATIONS

W. K. Clark and P. L. Levin, "Securing the information highway," Foreign. Aff., vol. 88, p. 2, 2009.

J. Villasenor, "Compromised by design? Securing the defense electronics supply chain." Center for Technology Innovation ac Brookings, 2013, 18 pages.

J. Villasenor, "The hacker in your hardware," Scientific American, vol. 303, No. 2, pp. 82-87, 2010.

L.W. Kim, J. D. Villasenor et al., "A Trojan-resistant system-on-chip bus architecture," in Military Communications Conference, 2009. MILCOM 2009. IEEE. IEEE, 2009, pp. 1-6.

Q. Yu and J. Frey, "Exploiting error control approaches for hardware Trojans on network-on-chip links," in Defect and Fault Tolerance in VLSI and Nanotechnology Systems (DFT). 2013 IEEE International Symposium 011. IEEE, 2013, pp. 266-271.

D. McIntyre, F. Wolff, C. Papachristou, S. Bhunia, and D. Weyer, "Dynamic evaluation of hardware trust," in Hardware-Oriented Security and Trust, 2009. HOST'09. IEEE International Workshop on IEEE, 2009, pp. 108-111.

L.-W. Kim and J. D. Villasenor, "Dynamic function replacement for system-on-chip security in the presence of hardware-based attacks," IEEE Transactions on Reliability, vol. 63, No. 2, pp. 661-675, 2014.

R. Torrance and D. James, "The state-of-the-art in IC reverse engineering," in Cryptographic Hardware and Embedded Systems-CHES 2009. Springer, 2009, pp. 363-381.

A. Waksman, M. Suozzo, and S. Sethumadhavan, "Fanci: identification of stealthy malicious logic using boolean functional analysis," in Proceedings of the 2013 ACM SIGSAC conference on Computer & Communications Security. ACM, 2013, pp. 697-708.

H. Salmani, "COTD: reference-free hardware Trojan detection and recovery based on controllability and observability in gate-level netlist," IEEE Transactions 011 Information Forensics and Security, vol. 12, No. 2, pp. 338-350, 2017.

J. Zhang, F. Yuan, L. Wei, Y. Liu, and Q. Xu. "Veritrust: Verification for hardware crust," IEEE Transactions on Computer-Aided Design of Integrated Circuits and Systems, vol. 34, No. 7, pp. 1148-1161, 2015.

M. Tehranipoor and F. Koushanfar, "A survey of hardware Trojan taxonomy and detection," IEEE design & test of computers. vol. 27. No. I, 2010, 16 pages.

R. S. Chakraborty, S. Narasimhan, and S. Bhunia, "Hardware Trojan: Threats and emerging solutions," in High Level Design. Validation and Test Workshop, 2009. HLDVT 2009. IEEE International IEEE, 2009, pp. 166-171.

D. Agrawal, S. Baktir, D. Karakoyunlu, P. Rohatgi, and B. Sunar, "Trojan detection using ic fingerprinting," in Security and Privacy, 2007. SP'07. IEEE Symposium on. IEEE, 2007, pp. 296-310.

M. Banga and M. S. Hsiao, "A region based approach for the identification of hardware Trojans," in Hardware-Oriented Security and Trust, 2008. HOST 2008. IEEE International Workshop on. IEEE, 2008, pp. 40-47.

M. Banga and M. S. Hsiao, "Vitamin: Voltage inversion technique lo ascertain malicious insertions in ics," 2009.

C. He. B. Hou. L. Wang, Y. En, and S. Xie, "A failure physics model for hardware Trojan detection based on frequency spectrum analysis," in Reliability Physics Symposium (IRPS), 2015 IEEE International. IEEE, 2015, pp. PR-I.

S. Narasimhan, D. Du, R. S. Chakraborty, S. Paul, F. Wolff, C. Papachristou, K. Roy, and S. Bhunia, "Multiple-parameter side-channel analysis: A non-invasive hardware Trojan detection approach," in Hardware Oriented Security and Trust (HOST), 2010 IEEE International Symposium on. IEEE, 20IO, pp. 13-18.

C. Bao, D. Forte, and A. Srivastava, "Temperature tracking: Toward robust run-time detection of hardware Trojans," IEEE Transactions on Computer-Aided Design of 111regrated Circuits and Systems, vol. 34, No. 10, pp. 1577-1585, 2015.

D. Forte, C. Bao, and A. Srivastava, "Temperature tracking: An innovative run-time approach for hardware Trojan detection," in Proceedings of the International Conference on Computer-Aided Design. IEEE Press, 2013, pp. 532-539.

J. He, Y. Zhao, X. Guo. and Y. Jin, "Hardware Trojan detection through chip-free electromagnetic side-channel statistical analysis," IEEE Transactions on Very Large Scale Integration (VLSI) Systems, vol. 25, No. JO, pp. 2939-2948, 2017.

J. Balasch, B. Gierlichs, and I. Verbauwhede, "Electromagnetic circuit fingerprints for hardware Trojan detection," in Electromagnetic Compatibility (EMC), 2015 IEEE International Symposium on. IEEE. 2015, pp. 246-251.

X. T. Ngo. Z. Najm, S. Bhasin, S. Guilley. and J.L. Danger. "Method taking into account process dispersion to detect hardware Trojan horse by side-channel analysis," Journal of Cryptographic Engineering vol. 6, No. 3. pp. 239-247.

K. Hu, A. N. Nowroz, S. Reda, and F. Koushanfar, "High-sensitivity hardware Trojan detection using multimedia characterization," in Proceedings of the Conference on Design, Automation, and Test in Europe. EDA Consortium, 2013. pp. 1271-1276.

A. N. Nowroz, K. Hu, F. Koushanfar, and S. Reda, "Novel techniques for high-sensitivity hardware Trojan detection using thermal and power maps." IEEE Transactions on Computer-Aided Design of Integrated Circuits and Systems, vol. 33, No. 12, pp. 1792-1805, 2014.

B. Cha and S. K. Gupta, "Efficient Trojan detection via calibration of process variations," in Test Symposium (ATS). 2012 IEEE 21st Asian. IEEE. 2012, pp. 355-361.

B. Cha and S. K. Gupta, "Trojan detection via delay measurements: A new approach to select paths and vectors to maximize effectiveness and minimize cost," in Proceedings of the Conference on Design, Automation and Test in Europe. EDA Consortium, 2013, pp. 1265-1270.

M. Lecomte, J. Fournier, and P. Maurine, "An on-chip technique to detect hardware Trojans and assist counterfeit identification," IEEE Transactions on Very Large Scale Integration (VLSI) Systems, vol. 25, No. 12, pp. 3317-3330, 2017.

P. V. Nikitin and K. S. Rao, "Theory and measurement of backscattering from rfid tags." IEEE Antennas and Propagation Magazine vol. 48, No. 6, pp. 212-218, 2006.

B. Shakya, T. He, H. Salmani, D. Forte, S. Bhunia, and M. Tehranipoor, "Benchmarking of hardware Trojans and maliciously affected circuits," Journal of Hardware and Systems Security No. 1, pp. 85-102, 2017.

S. Bhunia, M. S. Hsiao, M. Banga, and S. Narasimhan, "Hardware Trojan attacks: threat analysis and countermeasures," Proceedings of the IEEE, vol. 102. No. 8, pp. 1229-1247, 2014.

J. Zhang, F. Yuan, and Q. Xu, "Detrust: Defeating hardware trust verification with stealthy implicitly-triggered hardware Trojans," in Proceedings of the 2014 ACM SIGSAC Conference on Computer and Communications Security. ACM, 2014, pp. 153-166.

Z. Chen, X. Guo, R. Nagesh, A. Reddy, M. Gora, and A. Maiti, "Hardware Trojan designs on basys fpga board," Embedded system challenge contest in cyber security awareness week-CSAW, 2008.

R. S. Chakraborty, I. Saha, A. Palchaudhuri, and G. K. Naik, "Hardware Trojan insertion by direct modification of fpga configuration bit stream," IEEE Design & Test, vol. 30, No. 2, pp. 45-54, 2013.

(56) References Cited

OTHER PUBLICATIONS

X. Wang, M. Tehranipoor, and J. Plusquellic, "Detecting malicious inclusions in secure hardware: Challenges and solutions," in Hardware Oriented Security and Trust, 2008. HOST 2008. IEEE International Workshop on. IEEE, 2008, pp. 15-19.

R. Karri, J. Rajendran, K. Rosenfeld, and M. Tehranipoor, "Trustworthy hardware: Identifying and classifying hardware Trojans." Computer, vol. 43, No. 10, pp. 39-46, 2010.

J. M. Rabaey, A. P. Chandrakasan, and B. Nikolic, Digital Integrated Circuits. Prentice Hall Englewood Cliffs, 2002, vol. 2.

"Trusthub." http://www.tlust-hub.org/benchmarks/Trojan.

U. Guin, K. Huang, D. DiMase, J. M. Carulli, M. Tehranipoor, and Y. Makris, Counterfeit Integrated Circuits: A rising threat in the global semiconductor supply chain, Proceedings of the IEEE. vol. 102, No. 8, pp. 1207-1228, 2014.

International Search Report and Written Opinion dated Jun. 9, 2020, from International Application No. PCT/US2020/013836, 12 pages.

Extended European Search Report issued in Application No. 20741605.8, dated Sep. 9, 2022, 7 pages.

Mezzah, Ibrahim et al: "Assertion based on-line fault detection applied on UHF RFID tag", 2013 8th IEEE Design and Test Symposium, IEEE, Dec. 16, 2013 (Dec. 16, 2013), pp. 1-5, XP032560903.

Marcin M Morys et al: "Malevolent object detection using microwave RFID tags", RFID (RFID), 2013 IEEE International Conference on, IEEE, Apr. 30, 2013 (Apr. 30, 2013), pp. 50-57, XP032431978.

\* cited by examiner

SYSTEM AND METHOD FOR DETECTING HARDWARE TROJAN CIRCUITS

CROSS-REFERENCE TO RELATED APPLICATIONS

This application claims priority to and incorporates by reference both international application PCT/US2020/013836, filed on Jan. 16, 2020, entitled "System and Method for Detecting Hardware Trojan Circuits" and U.S. Provisional Patent Application Ser. No. 62/793,059 filed on Jan. 16, 2019 entitled "Detection of Dormant Hardware Trojans via Backscattering Side-Channel".

GOVERNMENT SUPPORT CLAUSE

This invention was made with government support under Grant No. 1651273 and Grant No. 1740962 awarded by the National Science Foundation and Grant No. N00014-17-1-2540 awarded by the Office of Naval Research. The government has certain rights in the invention.

BACKGROUND

Early research in the use of backscattering has led to the backscattering concept enabling radio frequency identification tags (RFID's) for transmitting information with very low energy expenditure [30]. A typical RFID system based on backscattering is illustrated in FIG. 1. Data transmission requires the RFID reader to emit a continuous wave (an RF signal at some frequency fc) toward the RFID tag. The RFID tag contains an antenna that can be connected to one of two impedances, Z0 or Z1, one of which is chosen to maximize the antenna's reflection coefficient (also called radar cross-section, or "RCS") for frequency fc, while the other impedance is chosen to minimize the antenna's RCS for fc. The RFID tag typically contains an application-specific integrated circuit (ASIC) chip that can electronically switch the antenna's connection between these two impedances, which modulates the signal that reflects (backscatters) from the antenna according to the data bits the RFID tag wishes to transmit. The RFID reader then receives and demodulates the backscattered signal to retrieve the data transmitted by the tag. This enables use of very compact RFID tags, because the energy for the signal "transmitted" by the RFID tag is entirely provided by the RFID reader. Typically, the electronic switching done by the RFID tag's ASIC is powered by energy-harvesting using the reader's signal, which completely eliminates the need for long-term energy storage (e.g., a battery) in the RFID tag. Along these lines, in the RFID line of work, a tag may be classified as passive, semi-passive, and active depending on whether the tag uses electromagnetic sources for power and communication, uses battery power for only its IC circuits, or uses battery power for both IC circuits and communication. Existing RFID tags with computational chips can only transmit 1 bit simultaneously. Existing analog-signal side-channels, such as electromagnetic emanations, are a consequence of current-flow changes that are dependent on activity inside electronic circuits. In this disclosure, a new class of side-channels is set forth that is a consequence of impedance changes in switching circuits, referred to herein as a back scatter side channel and/or an impedance-based side-channel. One early motivation to explore impedance-based side-channels was a hypothesis that the backscatter radio effect should be present in electronic devices.

Integrated circuits (IC) have become an integral aspect of the lives, by controlling most of electronic devices ranging from cellphones and washing machines to airplanes and rockets. Thus, the problem of ensuring authenticity and trust for integrated circuits is already critically important, especially for sensitive fields such as military, finance, and governmental infrastructure, and is gaining in importance as an increasing number of "things" become "smart" and connected into the Internet-of-Things (IoT). However, cost and time-to-market considerations have led integrated circuit vendors to outsource some, and in most cases many, steps in the integrated circuit supply chain. The sheer number and diversity of entities involved in modern integrated circuit supply chain, each with its own set of potentially malicious actors that can insert malicious modifications, referred as hardware Trojans (HT), in the integrated circuit (IC) [1], makes it difficult to trust the resulting ICs, especially when potentially adversarial foreign governments are among the potentially malicious actors in the IC supply chain. The term "hardware Trojan" is given its broadest plain meaning as a circuit, software, or combination of hardware and software that creates mistakes in operation similar to malware. The potential existence of HTs significantly undermines the trust in any system that uses that IC, because the hardware usually provides the base layer of security and trust that all software layers depend and build on [2], [3], [4]. Specifically, all software protections, correctness analysis, or even proofs rely on the hardware executing instructions as specified, and by violating this assumption, HTs can defeat the best software protections and/or subvert even software functionality that is otherwise completely correct and vulnerability-free.

Typically, an HT is designed to be stealthy, so it only changes the functionality of the original circuit when specific conditions have been met. Thus the design of an HT typically has two key components: the payload, which implements the modification of the original circuit's behavior', and the trigger, which detects when the conditions for activating the payload have been met. The HT's payload can also implement a non-functional change in the IC's behavior, e.g., to increase its power consumption, increase the IC's side channel leakage of information, decrease its expected lifetime, etc. The conditions that activate an HT occur very rarely, and until activated the payload is usually highly inert—it simply allows the IC to follow its original input/output behavior. This makes HTs extremely challenging to detect by traditional functional verification and testing—test inputs are unlikely to activate the HT, and without activation the HT has no effect on functional behavior of the IC.

Most software systems are built on the assumption that the underlying hardware can be trusted to perform the requested operations correctly, and even when incorrect hardware behavior is considered, it is assumed to be erroneous rather than malicious. HTs break this assumption, so the potential presence of unknown HTs in the system's hardware effectively eliminates trust in the overall system regardless of how trustworthy the system's software is. Over the past several years, numerous papers have been published on the topic of understanding the intent, behavior [14], [32] and implementation of HTs [33], [34], [35], [31]. Several studies have focused on characterizing and classifying HTs [36], [13], [37], [31] according to an activation mechanism, functionality, location on the IC, the point in the IC design cycle and supply chain at which they are inserted, etc. A common characteristic of HTs is that they are designed to avoid detection, so they activate their malicious functionality rarely [32] to avoid being relatively easily detected, e.g.

during functional testing of the IC. Therefore, a typical HT consists of a trigger circuit and payload circuit, as illustrated in FIG. 6A. The trigger circuit is monitoring a set of signals to detect when the conditions for activation of the payload have been met, while the payload implements the actual malicious functionality. The malicious functionality can be functional, e.g. when the HT's output modifies the outputs of the overall circuit to cause harm or leak sensitive information, and/or non-functional, e.g., when the payload increases power consumption, causes excessive wear-out to reduce the lifetime of the IC, leaks sensitive information through a side channel, etc.

The life cycle of an IC is depicted on the left side of FIG. 6B. Ideally, all of the steps in this life-cycle would be performed by a single trusted entity, which would design, fabricate, test, package, and deploy the IC. However, cost-reduction, time-to-market IC complexity, and other considerations have recently led companies to specialize in a single step in the IC design and/or manufacturing, so the overall IC is typically designed by one entity, usually includes intellectual property (IP) blocks of several other entities and design tools from yet another entity, is fabricated, tested, and packaged by one or more other entities, and is finally deployed by yet another entity. Different parts of the life cycle typically also take place in several different countries. A subset of opportunities for inserting HTs into the IC is shown on the right side of FIG. 6B, but technically, HTs could be injected to an IC by adversaries at any stage of its design and fabrication flow. Please note that the example threat model assumes a "golden" IC (known to be HT-free) can be used as a reference for training of the HT-detection mechanism. This disclosure takes into account that this assumption is often unrealistic for practical deployments of HT detection, and the examples illustrate evaluating HT detection with this assumption because it allows a fair comparison with another side channel (the EM side channel). Removing the golden-reference assumption would make the results heavily dependent on the accuracy of the model and the simulator that generate the reference signals, and different side channels would require different models/simulators that would be hard to equalize in accuracy/quality. Thus in one non-limiting sense, this disclosure evaluates the new backscattering side channel, and compares it to the EM side channel, under the same assumptions/conditions, in order to demonstrate the advantages of this new side-channel, namely that it can detect much smaller circuit modifications, is less susceptible to manufacturing variability, and can detect dominant HTs.

Some techniques focus on making the IC resilient to the presence of HTs, i.e., on preventing the HT's payload from modifying the behavior of the IC, mostly by using fault-tolerance inspired approaches to operate correctly even when an HT has been able to modify some of the internal signals. However, these techniques protect only certain parts of the system, such as a bus [5] or on-chip interconnect [6], require redundant activity during normal operation [7], and/or rely on reconfigurable logic [8].

Most counter-HT techniques focus on detecting the presence of HTs. Some HT detection approaches are destructive, e.g., relying on successive removal of the IC's layers to scan the actual layout of the IC, reverse-engineer its GDSII and/or netlist-level design [9], and compare it to a trusted design. However, all the ICs that are found to be HT-free through such analysis are also destroyed by the scan, and the reverse-engineering is extremely expensive and time-consuming, so such destructive techniques can only be applied to a small sample of the larger population of IC.

Non-destructive HT detection approaches can be categorized according to whether they are applied to the design of the yet-to-be-fabricated IC (pre-silicon approaches), or to fabricated IC (post-silicon approaches). Pre-silicon approaches use functional validation, and code and gate-level netlist analysis [10], [11], but they cannot detect HTs that are inserted after the design stage, e.g. by editing the physical layout of the IC at the foundry. To overcome such concerns, post-silicon methods attempt to identify HTs in ICs received from the foundry.

Post-silicon non-destructive approaches detect HTs either through testing the functional properties of the IC, or by measuring non-functional (side channel) behavior of the IC as it operates. Functional testing involves finding inputs that are likely to trigger unknown HTs that may exist in the IC, causing the payload of the HT to propagate the effects of the payload to the outputs of the IC, where they can be found to differ from expected outputs [12]. However, trigger conditions for HTs are designed to be difficult to reach accidentally, so the probability of detecting HTs is extremely low for conventional functional testing techniques. Additionally, functional testing techniques are likely to fail in detecting HTs whose payload does not change the input/output behavior or the IC, but rather causes increased power consumption, side channel leakage of sensitive information, etc.

Among post-silicon approaches, HT detection through side channel analysis appears to be the most effective and widely used approach [13], [14]. These methods measure one or more non-functional properties of the IC as it operates, and compare these measurements to reference signals obtained through either simulation or measurement on a device known to be genuine. Side channels used by HT detection techniques include power consumption [15], [16], [17], [18], leakage current [19], temperature [20], 21], and electromagnetic emanations (EM) [22], [23], [24], and some approaches even combine measurements from multiple side channels [25], [26].

Among side channel-based HT detection approaches, some add the side channel measurement capability to the chip itself, while others rely on measurements that are external to the chip itself. With on-chip measurement, the measurement circuitry is added to the design (27], [28], [29], which allows the specific chosen signals to be measured close to the signal's source. However, the additional circuitry for measurement, and for routing the desired signals to the measurement circuitry, impacts chip size, manufacturing cost, performance, and power, and this impact increases as the set of individually measurable signals increases.

Finally, external-measurement side channel techniques require no modifications to the IC itself, and instead rely on externally observable side-effects of the IC's normal activity. Since an HT is typically much smaller than the original circuit, an ideal side channel signal would have little noise and interference so that the HT's small contribution to the signal is not obscured by the noise. Additionally, the HT's payload is largely inert until activated, and activation during measurement is highly unlikely, so ideally the side channel signal would be affected by the presence of the payload circuitry, even when it is inert. Finally, before activation, what little switching activity the HT does create is in its trigger component, which usually has only brief bursts of switching when the inputs it is monitoring change. Thus an ideal side channel signal would have high bandwidth, such that these brief bursts of current fluctuation due to switching activity in the HT can be identified. Unfortunately, existing externally-measurable side channel signals, such as temperature, voltage and power supply current, and electromagnetic emanations [22], tend to vary mostly in response to current variation due to switching activity. However, temperature changes slowly and has very limited bandwidth, and voltage and supply current have low bandwidth [24] because on-chip capacitances that help limit supply voltage fluctuation act as a low-pass filter with respect to both current and voltage as seen from outside the chip. Electromagnetic emanations can have high bandwidth, but their signal-to-noise ratio is affected by noise and interference.

SUMMARY

To improve the prediction accuracy and to overcome the limitation in spatial and temporal extensibility of individual empirical models, systems, methods and devices are disclosed.

A system for detecting hardware Trojans in a computerized device includes a digital circuit having switching components operating pursuant to at least one clock frequency and positioned within an interrogation range of an incident carrier wave. A modulated backscatter response is reflected from the digital circuit upon arrival of the incident carrier wave in the presence of the switching operations, A detection device is positioned to receive the modulated backscatter response. A computer connected to the detection device identifies harmonics of a respective clock frequency of the digital circuit from the backscatter response and identifies characteristics of the harmonics indicating a presence or an absence of a hardware Trojan connected to the digital circuit.

It should be understood that the above-described subject matter may also be implemented as a computer-controlled apparatus, a computer process, a computing system, or an article of manufacture, such as a computer-readable storage medium. Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
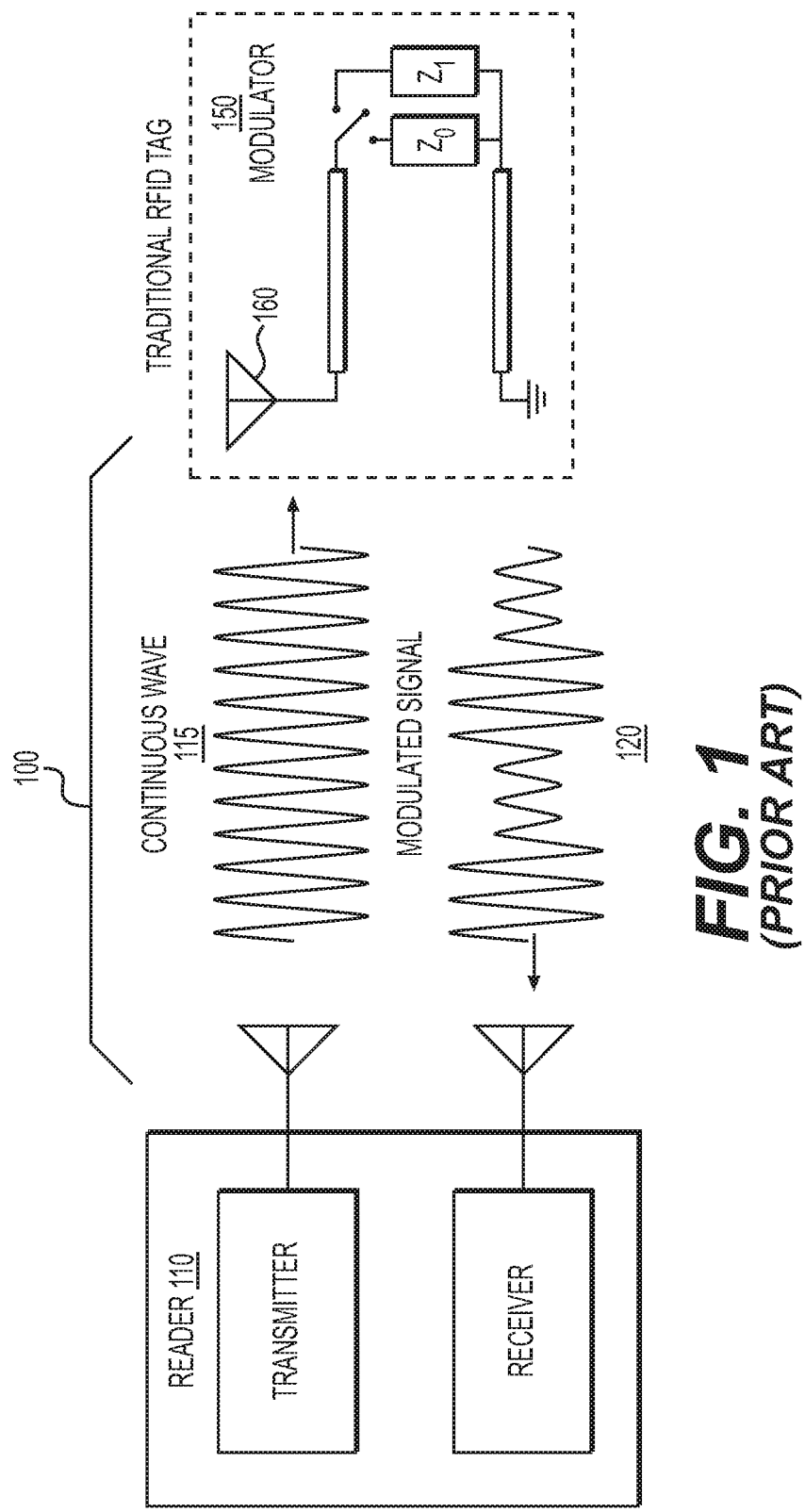
FIG. 1 is a PRIOR ART representation of a known RFID tag identification system.

Before the present methods and systems are disclosed and described, it is to be understood that the methods and systems are not limited to specific computerized methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. "Optional" or "optionally" means that the subsequently described event or circumstance may or may not occur, and that the description includes instances where said event or circumstance occurs and instances where it does not.

The present methods and systems may be understood more readily by reference to the following detailed description of preferred embodiments and the examples included therein and to the figures and their previous and following description. As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

This paper introduces a new physical side channel, i.e., the backscattering side channel, that is created by transmitting a signal toward the integrated circuit, where the internal impedance changes caused by on-chip switching activity modulate the signal that is backscattered (reflected) from the IC. To demonstrate how this new side-channel can be used to detect small changes in circuit impedances, this disclosure describes implementing a new proof-of-concept method for non-destructively detecting HTs from outside of the chip. This disclosure is the first off-chip side channel technique capable of detecting inactive HTs while tolerating variations that exist across hardware instances. Also, backscattering has never before been used as a side channel signal to infer information about the operation of electronic circuitry, even though backscattering has been used extensively for RFID tags and other short range communications [30]. The embodiments observe that backscattering not only can be used as a side channel signal, but also that it is especially suitable for HT detection because the backscattered signal carries information about the current state of on-chip impedances, unlike traditional side channels that carry information about brief changes in current. Furthermore, like the traditional EM side channel, the backscattering side channel has a high bandwidth but, unlike the traditional EM signal, the strength of the backscattered signal can be increased when needed, its frequency can be shifted to avoid noise, interference, and poor signal propagation conditions, and it can be more accurately focused on a specific part of the chip. Testing the HT detection technique includes using multiple HTs from the Trusthub benchmark [31] and showing that the systems and methods of this disclosure are highly accurate in detecting even inactive HTs while avoiding false positives.

This disclosure compares the disclosed approach to one that applies the same signal analysis to traditional electromagnetic emanations, and the results disclosed herein confirm that backscattering yields a dramatic improvement in HT detection accuracy. This disclosure further evaluates the sensitivity of the new approach by separately reducing the size of the HT's trigger and payload components, and showing that HT detection of inactive HTs largely depends on the size of the trigger component, and that this newly disclosed approach can detect even HTs with significantly reduced triggers. Additionally, this disclosure also evaluates how this approach is affected by manufacturing and other variations, by using different physical instances of the same design for training and testing, and find that the technique largely maintains its ability to detect HTs accurately even when trained on only one instance and used to test another. Finally, the disclosure illustrates how this new side-channel and detection mechanism can be used for IC counterfeit detection where a functionally equivalent circuit is used instead of the original one. Specifically, this disclosure shows the cases where 1) the counterfeit IC has the same functionality and internal layout, but is placed at a different position on the overall chip, or 2) the counterfeit IC has the same functionality and position on the chip, but uses a different internal layout. The results show that the techniques disclosed herein can reliably detect these counterfeits.

Figure 2C:
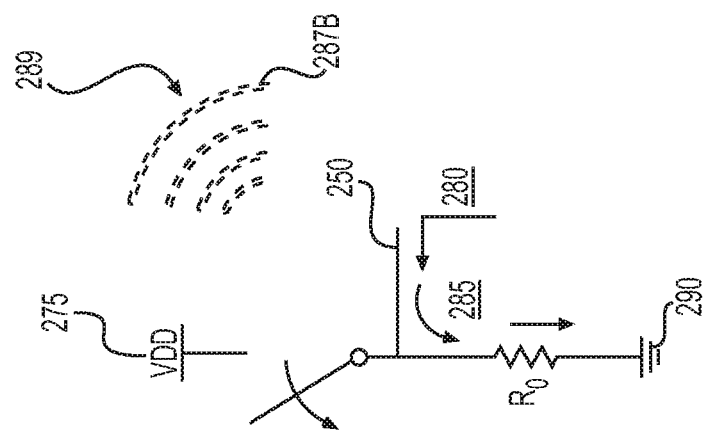
FIG. 2C is a schematic representation of a high voltage input at the CMOS-NAND gate of FIG. 2A, turning on an NMOS transistor therein, and yielding a low state resistance (R0) upon the NMOS transistor therein and a distinct radar cross section of a backscatter response as set forth in one example of this disclosure.
Figure 2B:
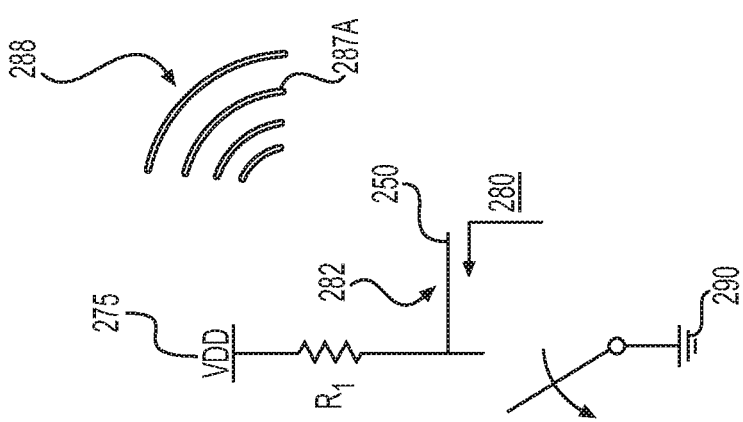
FIG. 2B is a schematic representation of a low voltage input at the CMOS-NAND gate of FIG. 2A, turning on a PMOS transistor therein, and yielding a high state resistance (R1) and a distinct radar cross section of a backscatter response at the PMOS transistor as set forth in one example of this disclosure.
Figure 2A:
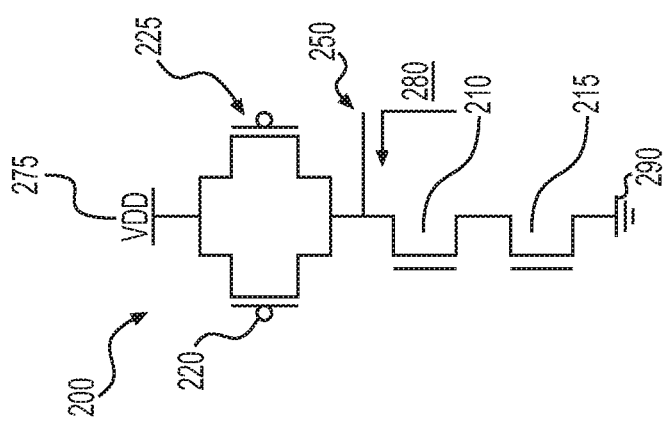
FIG. 2A is a PRIOR ART schematic representation of a digital circuit implementing an output circuit of a CMOS-NAND gate as set forth in one example of this disclosure.

FIGS. 2A, 2B, and 2C illustrate one non-limiting theory of operation of certain aspects of this disclosure by showing that impedance differences between transistor gates 200 in the high-state 282 and in the low-state 280 change the radar cross section (RCS) 288, 289 of the back-scatter response and modulate the backscattered signal 287A, 287B. This theory of operation yields a proposed digital circuit that can be used as a semi-passive RFID tag. The RFID tag may be implemented in a field programmable gate array 499 (FPGA) as one non-limiting proof of concept. More importantly, this approach opens up new possibilities for RFID designers to experiment with impedances of transistors switching from high-state to low-state and further optimize this transmission mechanism in ASIC designs.

Figure 3:
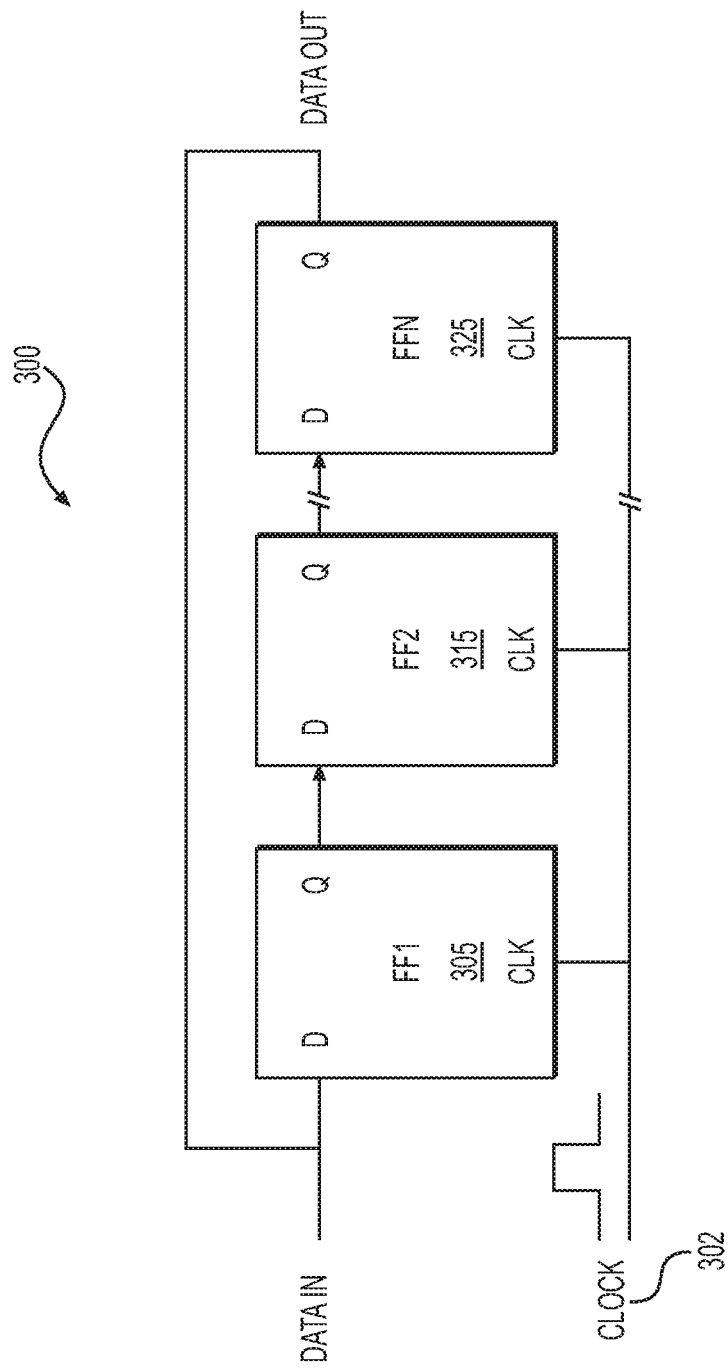
FIG. 3 is a diagram of a shift register utilizing a series of flip flop circuit components as disclosed in one example herein.
Figure 4:
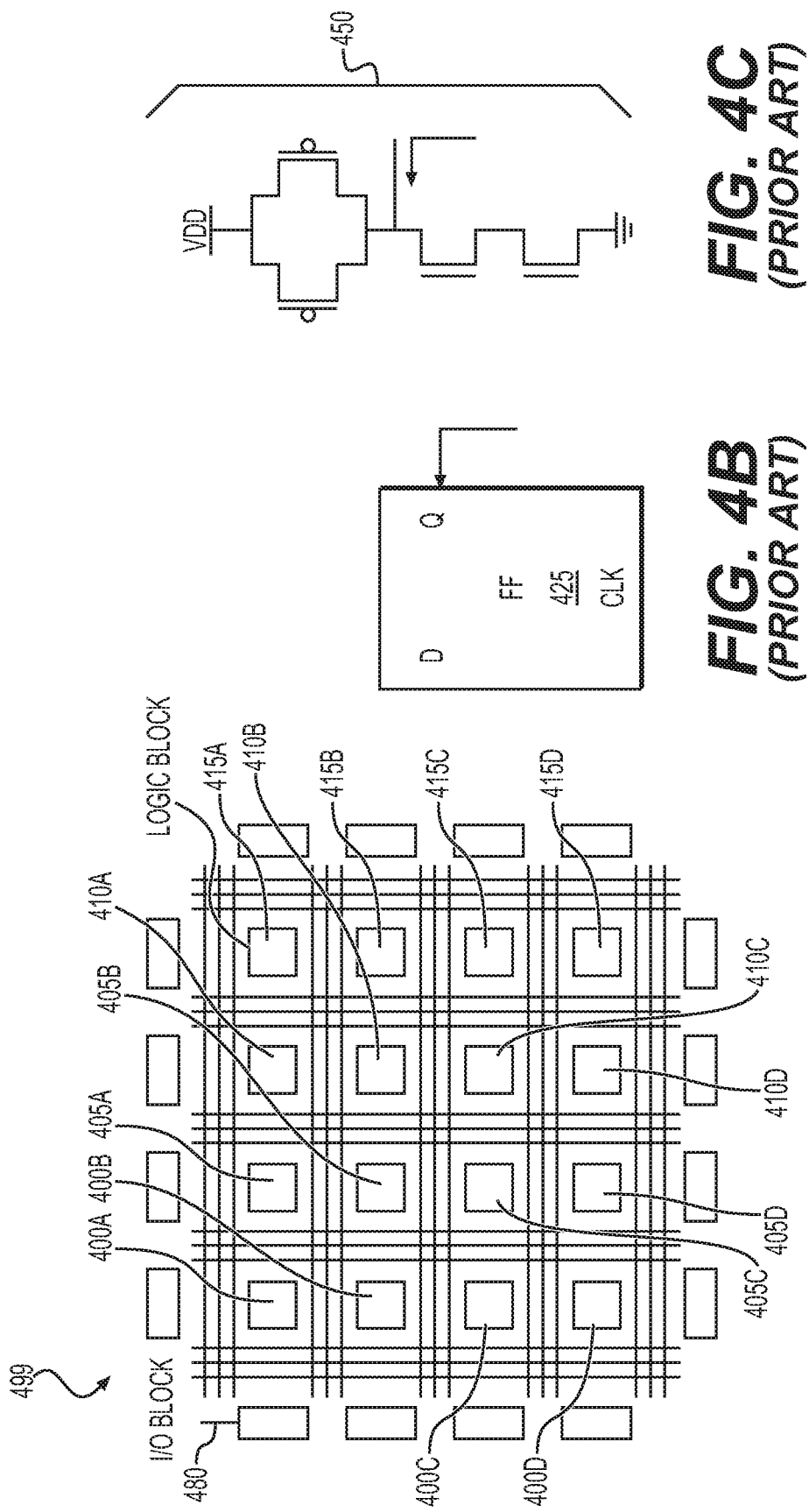
FIG. 4A is a diagram of an FPGA internal structure as set forth in one example of this disclosure.
FIG. 4B is a PRIOR ART diagram of one programmable flip flop circuit component used to implement a digital circuit as described in at least one example of this disclosure.
FIG. 4C is a PRIOR ART diagram of an equivalent circuit of the CMOS-NAND gate of FIG. 2A.

One non-limiting hypothesis for how circuits described herein may provide the above noted information channels was that inverters 200 in digital electronics also have two-state RF loads and can be designed to reflect the modulated signal 288, 289. For example, as shown in FIGS. 2A, 2B, and 2C, when input voltage is low, NMOS transistors 210, 215 in inverters are off and PMOS transistors 200, 225 are on. A direct path 282 exists between Vout 250 and VDD 275, resulting in a high output state 280. On the other hand, high input results in a low output state. As shown in FIG. 2B there exists a finite resistance R1 between the output 250 and VDD 275 and between the output 250 and the ground 290, respectively. The switching between the example NAND logic's high output state (R1) and low output state (R0) creates impedance variation in the example of FIG. 2, which is analogous to the variation in antenna terminating impedance in typical RFID tags of FIG. 1. The impedance variation creates a difference in the circuit's radar cross section (RCS) illustrated as a variable back scatter radiation field 288, 289, and thus modulates the electronic backscatter signals. To test this hypothesis, this disclosure uses a Field-Programmable Gate Array (FPGA) 499 and an example program of a cyclical shift register 300 out of flip-flops 305, 315, 325 shown in FIG. 3 that consists of a large number of inverters 400, 405, 410, 415 connected in parallel as shown in FIG. 4, where A, B, C, D designations illustrate sets of inverters operating at a same modulation frequency. As shown in FIG. 3, a shift register 300 is a group of flip-flops 305, 315, 325 set up in a linear fashion with their inputs and outputs connected together such that the data is shifted from one device to another when the circuit is active. FIG. 3 illustrates use of linear feedback shift registers (LFSRs), i.e., the shift register 300 connects the most significant bit, MSB (FFN in FIG. 3) back to the least significant bit, LSB (FF1 in FIG. 3) to cause the function to endlessly cycle through a sequence of patterns.

A simplified internal structure of an FPGA chip is shown in FIG. 4A where logic blocks are arranged in a two-dimensional grid and are connected by a programmable routing inter-connects. This symmetrical grid is connected to I/O blocks 480 which make off-chip connections. The "programmable/re-configurable" term in FPGAs indicates their ability to implement a new function on the chip after its fabrication is complete. Logic blocks can be simplified as programmable flip-flops 425 shown in FIG. 4B. Most flip flops are based on CMOS-NAND gates due to their low latency. An equivalent output circuit 450 of a CMOS-NAND gate is shown in prior art FIG. 4C. When input voltage is low, NMOS transistors are off and PMOS transistors are on. A direct path exists between Vout and VDD, resulting in a high output state. On the other hand, high input results in a low output state. This change between states with different impedance creates a difference in the circuit's radar cross section (RCS) and thus modulates the electronic backscatter signals.

In addition to the switching pattern, the number of simultaneously-switched elements is another factor that affects electronic backscattering modulation. The more flip-flops are switching in unison, the stronger the backscatter signal is. To control the number of elements that switch simultaneously, one example embodiment use an N-bit shift register shown in FIG. 3, where N can be used to control the number of simultaneously-toggled flip-flops. FIG. 3 shows a simplified schematic for a 3-bit shift register, created by connecting N=3 flip-flops (FFs) 305, 315, 325.

The proposed RFID tag operates the same as traditional RFID when only one inverter is used to create two impedance states, i.e., only a single-bit single-sideband transmission is created. However, when higher data rate is needed, traditional RFID uses multiple amplitude and/or phase levels and multi-bit modulation schemes to transmit the message in a single-sideband transmission. With dedicated ASIC, the proposed RFID can be designed in a similar fashion. However, it is also possible to have multiple inverters 400A-D, 405A-D, 410A-D, 415A-D in the FPGA 499 that switch at different frequencies, allowing for dynamic or static multi-bit designs using frequency modulation as shown in FIG. 4.

Figure 5:
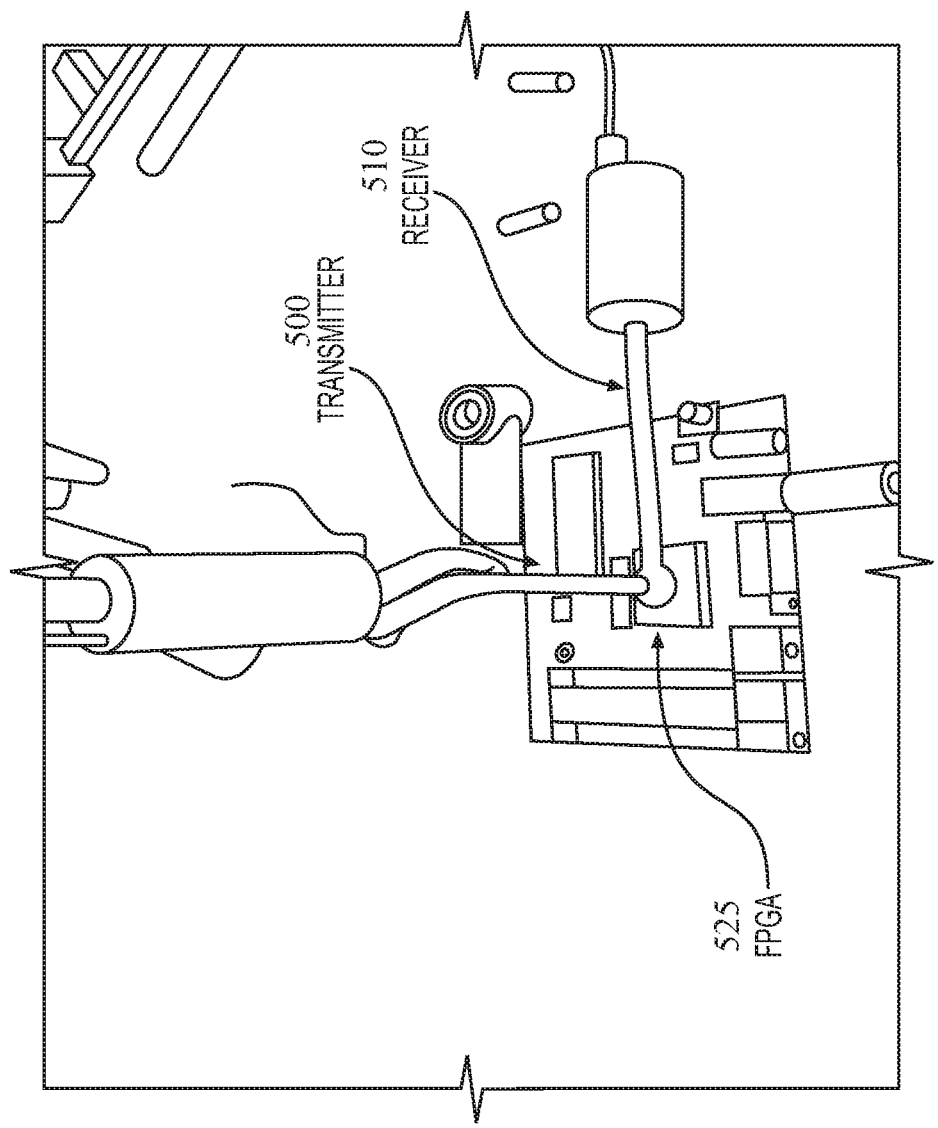
FIG. 5 is an illustration of the measurement setup for hardware Trojan detection using IP side channel.
Figure 6A:
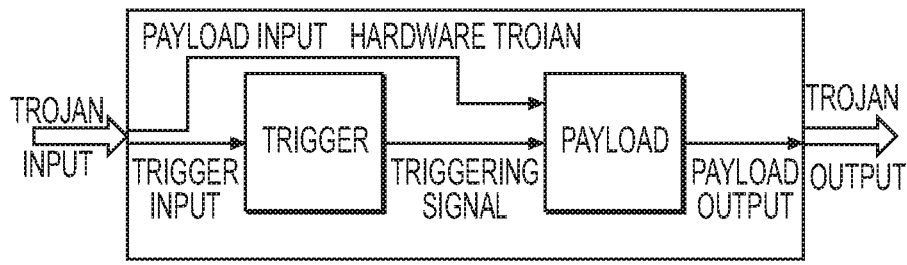
FIG. 6A is an illustration of a simplified block diagram of a hardware Trojan.
Figure 6B:
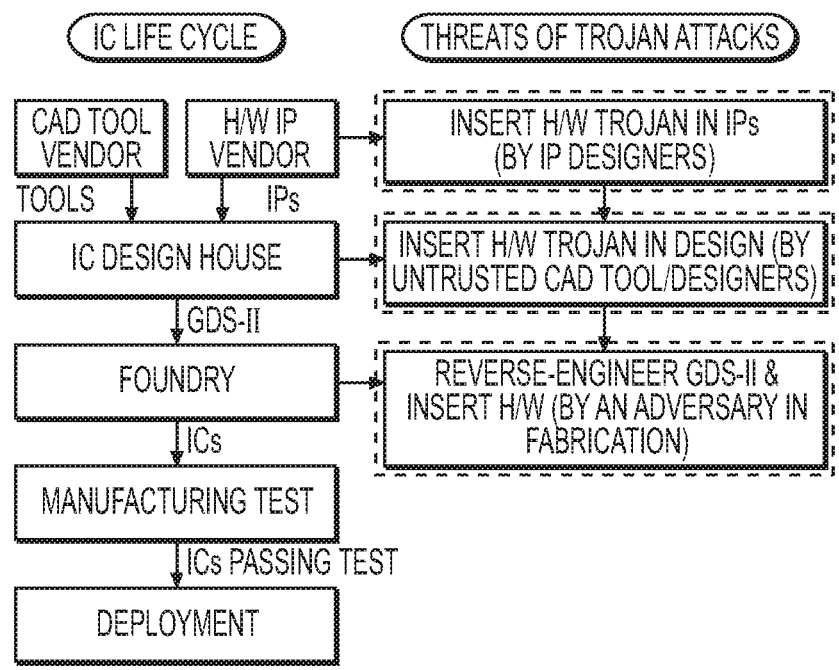
FIG. 6B is an illustration of an integrated circuit (IC) life cycle with examples of hardware Trojan insertion activity [32].
Figure 7:
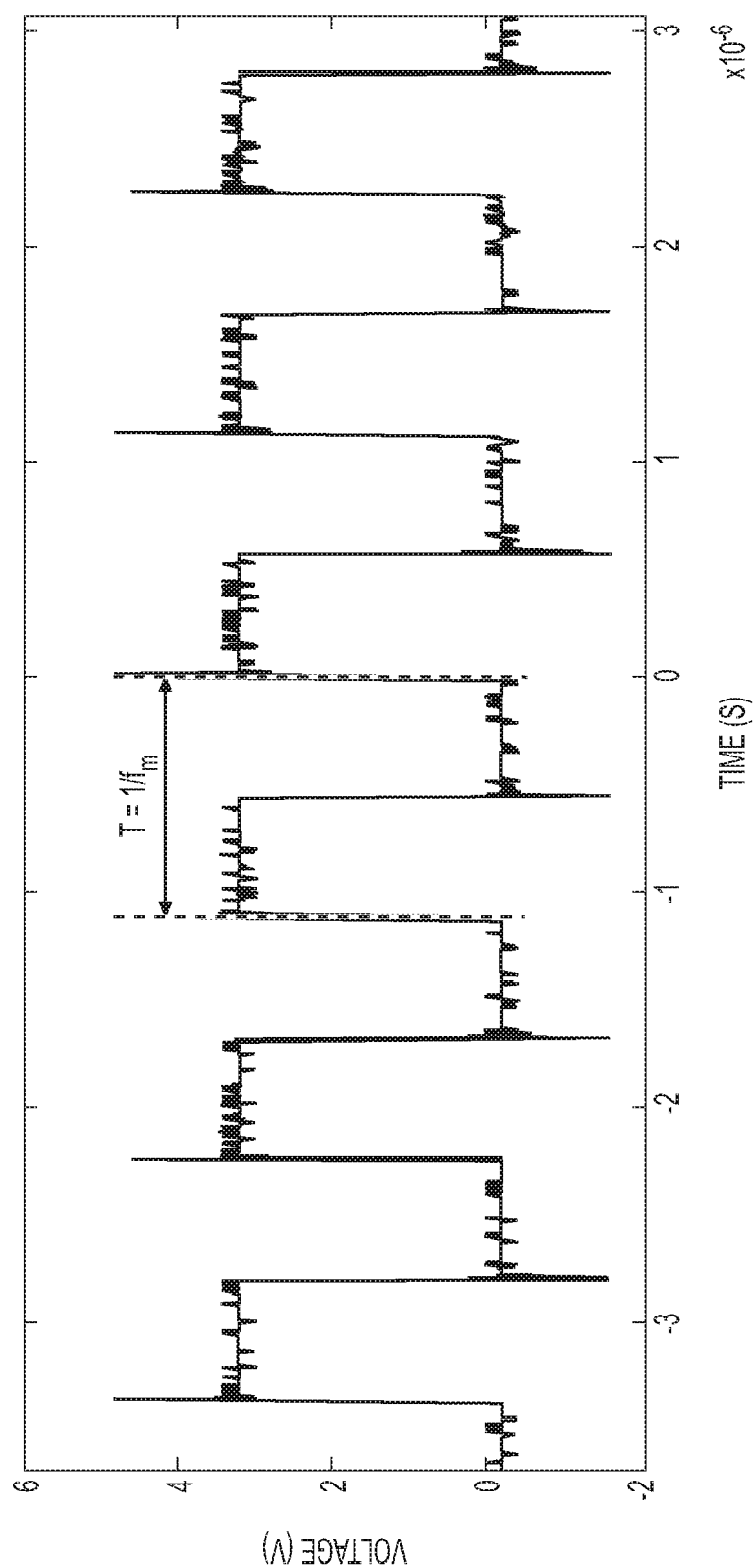
FIG. 7 is a Measured voltage at the output of flip-flops switching at fm=900 kHz.

In one non-limiting embodiment of this disclosure a transmitter 500 is configured to transmit a continuous wave (sinusoidal) signal at frequency $f_{carrier}$ toward the FPGA chip 525, and a receiver 510 receives the backscattered signal using the same setup as in FIG. 5. The transmitter 500 and receiver 510 The backscattered signal, if it is modulated by the switching activity, should contain not only a component at f but also side-band components at frequencies $f_{carrier}-f_m$ and $f_{carrier}+f_m$. The $f_{carrier}$=3.031 GHz in this experiment was chosen to avoid interference from other periodic signals on the DE0-CV board, e.g. the crystal-oscillator-controlled 50 MHz clock and its harmonics. To ensure that the side-channel created by the backscattering effect corresponds to on-chip activity, none of the flip-flop outputs is used to control any off-chip activity, and all of the FPGA chip's output pins are kept in a constant state throughout the experiment.

Figure 8:
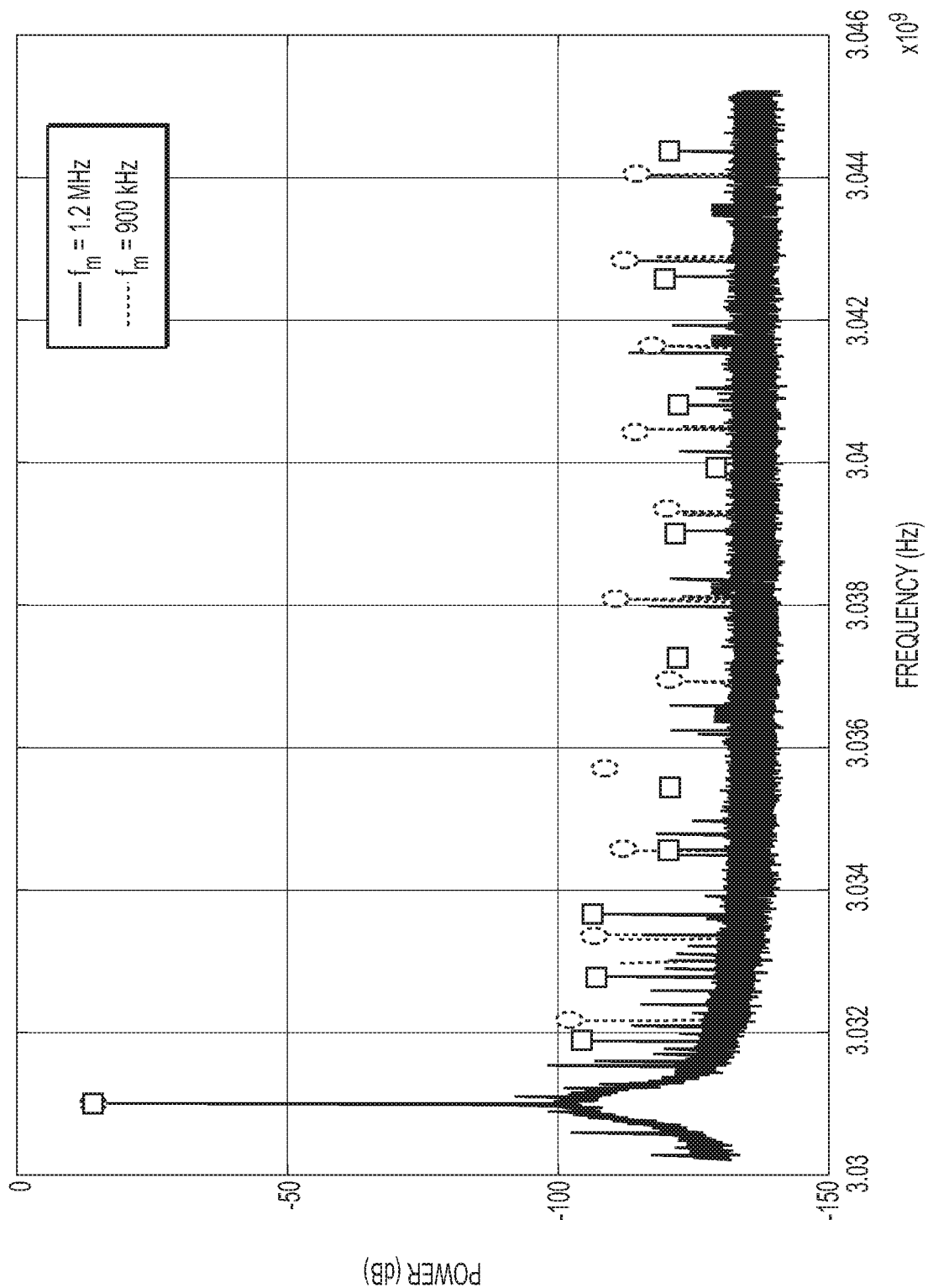
FIG. 8 is Measured backscatter power with f carrier=3.031 GHz and f m=900 kHz (blue), 1.2 MHz (red), respectively.

FIG. 8 plots the spectra of the backscattered signal in this experiment. The first spectrum was collected for fm=900 kHz. This spectrum contains a strong component at $f_{carrier}$, which represents the unmodulated part of the backscattered (reflected) signal, and also side-band signals 900 kHz to the left and to the right of $f_{carrier}$. These side-band signals are a consequence of the carrier signal being modulated by on-chip toggling activity through the backscattering effect. To further increase confidence that these side-band signals are indeed a consequence of the backscattered signal being modulated by on-chip toggling, the embodiments herein change the $f_m$ to 1.2 MHz, and observe that the spectral component at $f_{carrier}$ remains at the same frequency, and the frequencies of side-band components change with fm as predicted by the modulation hypothesis (sidebands at $f_{carrier} \pm f_m$).

The embodiments note that these measurements were conducted in an indoor office environment, in the presence of measurement instruments, LCD monitors, mobile phones, WiFi routers, etc. that all create interference at various frequencies. While this can be a problem for measurements using the traditional electromagnetic side channels, where some of the interference may be in the same frequency bands in which the chip produces side-channel emanations, with the backscattering side channel such interference can be avoided by selecting $f_{carrier}$ such that no strong interference is present in a wide frequency band around it. Finally, please note that the signal the embodiments are injecting into the board is well below levels that may cause faults (whether transient or permanent) on the FPGA chip or elsewhere on the board.

Switching in digital circuits causes internal impedances to vary, which causes changes in the circuit's radar cross-section (RCS), and thus modulates the carrier wave that is backscattered by the circuit. This new side channel is impedance-based, so it can be beneficial to detection of HTs because the HTs added circuitry, and also the additional connections attached to existing circuitry, result in modifications to the chip's RCS and in how that RCS changes as the on-chip circuits switch. Note that although the HT's trigger tends to be small, it exhibits
switching activity as its logic reacts to inputs from the original circuitry, and it adds connections to the chip's original circuitry to obtain those inputs. Most digital logic circuits are synchronous, so the overall switching pattern follows the clock cycle. Furthermore, the clock cycle usually accommodates switching delays along entire paths of logic gates, which means that the impedance changes of individual gates occur abruptly at some point in the clock cycle, i.e., they have a square-wave-like waveform. This implies that the backscattered signal will contain
side-band components for several harmonics of the circuit's clock frequency f0. These side-band components will be at fcarrier±fc, fcarrier±2fc, fcarrier±3fc, etc., and the components
at fcarrier±fc (that correspond to the first harmonic of the clock frequency) will mostly follow the overall RCS change during a cycle, while the components for the remaining harmonics will be influenced by the rapidity (rise/fall times) and timing of the impedance changes within the clock cycle.

Therefore, the detection of HTs using the backscattering side channel will rely on measuring the amplitude of the backscattered signal at fcarrier±fc, fcarrier±2fc, fcarrier±3fc, i.e., the side-bands for the first m harmonics of the clock frequency. The embodiments use only the amplitude (i.e. the embodiments ignore the signal's phase and other properties), mainly because the amplitude at some desired frequency is relatively easy to measure, whereas the phase and other properties require much more sophisticated tuning, phase tracking, etc. Furthermore, the embodiments note that each clock harmonic produces two side-band components that have the same amplitude, so the measurement can be made more efficient by only measuring m points to the left, or m points to the right, of fcarrier. In this paper the embodiments measure points to the light of the carrier, i.e. fcarrier, etc. The embodiments call the m amplitudes measured for a given circuit a trace, and each trace characterizes the circuit's overall amount, timing, and duration of impedance-change activity during a clock cycle. Intuitively, HTs can then be detected by first collecting training traces, using one or more ICs that are known to be HT-free, and then HT detection on other ICs would consist of collecting their traces and checking if they are too different from the traces learned in training. However, the amplitude of a received signal declines rapidly with distance, the measurements are performed close to the chip, so even small variations in positioning of the probes create significant amplitude changes, and would result in numerous false positives when training and detection are not using identical probe positioning (which is very hard to achieve in practice).

Fortunately, the distance affects all of the points in a trace similarly, i.e. distance attenuates all amplitudes in the trace by the same multiplicative factor. Therefore, rather than using amplitudes for trace comparisons, the embodiments use amplitude ratios, i.e. amplitude of a harmonic divided by the amplitude of the previous harmonic, which cancels out the trace's distance dependent attenuation factor. Measurement of signal amplitude are often expressed in decibels, i.e., on a logarithmic scale, and for these measurements, subtraction of logarithmic scale amplitude values yields the logarithmic-scale value for the amplitude ratio. The resulting "m−1" amplitude ratios are then used for comparing traces.

To illustrate amplitude ratios and how they are affected by differences in the tests circuit, FIG. 8 shows the statistics (mean and standard-deviation error bars) of each amplitude-ratio point, for a genuine AES circuit [31], and for the same AES circuit to which the T1800 Trojan from TrustHub [39] has been added but remains inactive throughout the measurement. In this experiment the carrier frequency is fcarrier=3.031 GHz, the AES circuit is clocked at $f_{clock}$=20 MHz, and amplitudes for m=35 right-side-band harmonics are measured to obtain the 34 amplitude ratios shown in FIG. 9.

Figure 9:
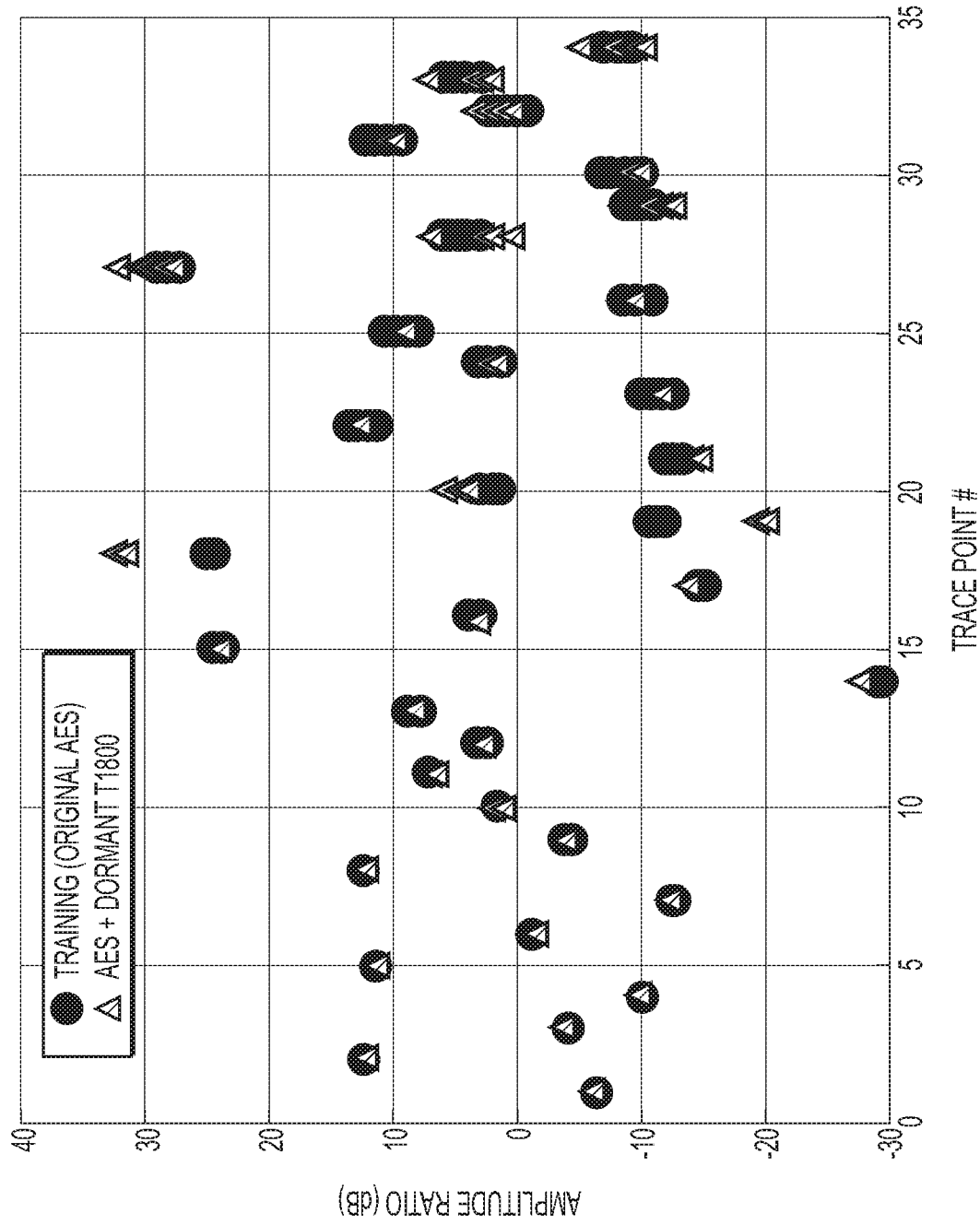
FIG. 9 is an example plot of amplitude ratios for HT-free and HT-afflicted AES.

The embodiments observe that different amplitude-ratio points for the same trace vary significantly, from −30 dB to 35 dB in FIG. 9, and that different measurements for the same amplitude ratio point tend to very much less than that, making these differences difficult to see in FIG. 9, except for the very large differences between the HT-free and HT-infected design at the 18th and 19th amplitude ratio. This indicates that the impedance change is very small and the differences can be observed only at higher harmonics of the clock.

Figure 10:
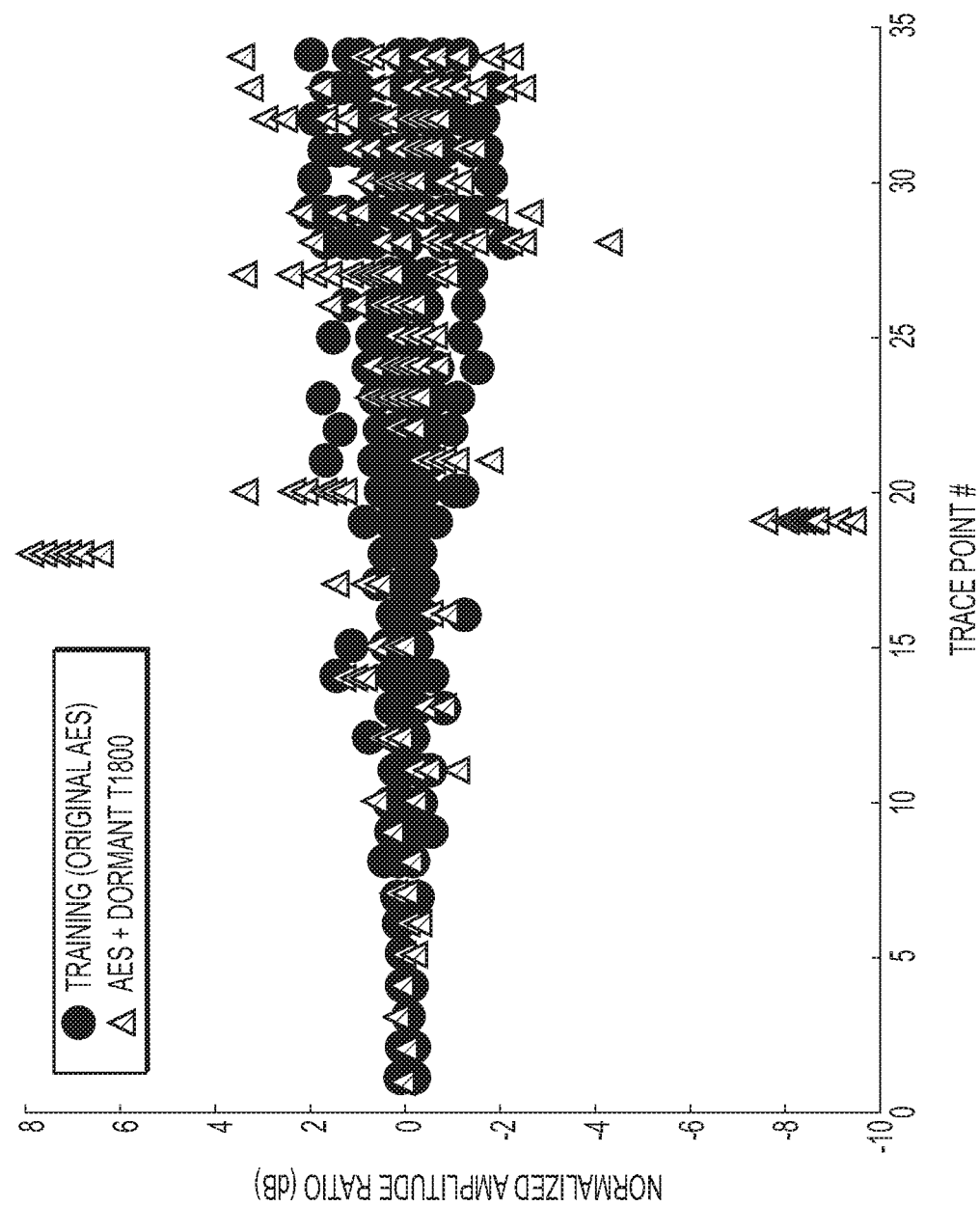
FIG. 10 is an example plot of amplitude ratios for HT-free and HT-afflicted AES, with each point normalized to the mean of its HT-free measurements.

To more clearly show the differences at other harmonic ratio points, FIG. 10 shows amplitude-ratio points that have been normalized to the mean amplitude ratio for the genuine AES circuit, i.e., for each amplitude ratio, the logarithmic-scale points are shifted such that the genuine AES circuit's mean amplitude ratio becomes zero. It can now be observed that, in addition to the 18th and 19th point, which exhibit very large differences between the HT-free and the HT-afflicted measurements, the two circuits differ significantly in a number of other points. Measurements for the two circuits are fully separable using the 14th point or the 20th point, and numerous other points have very little overlap between the HT-free and the HT-afflicted sets of measurements.

From FIG. 10, it can also be observed that the variance among measurements for the same design tends to increase with the index of the amplitude-ratio point, i.e., for points that correspond to higher harmonics, the primary cause of this increased variance is that higher harmonics of the signal tend to have lower amplitude, which makes their measurement less resilient to noise. Another factor that helps explain this increase in variance among higher harmonics is that they are affected by very small differences in timing of impedance changes during the clock cycle, and factors such as temperature and power supply voltage fluctuation can create small changes in the switching speed of the gates, and thus in the timing of the resulting impedance changes.

Regardless of the reason for the increasing variance among measurements of higher harmonics, the fact that the variance does increase is an important motivation for using an impedance-based side channel rather than one created by bursts of current. Specifically, for each gate that switches, the impedance change persists for the rest of the cycle, while the burst of current is very brief in duration. This means that the impedance-change contributes to lower frequencies than the current-burst signal. When activity from cycle to cycle is repetitive, the spectrum of the signal's within-a-cycle waveform is projected onto the harmonics of the clock frequency, so gate-switching activity tends to affects lower harmonics of the clock frequency in impedance-based side channels than in current-burst based side channels. As lower harmonics tend to have less variance from measurement to measurement, impedance-based side channels can be expected to perform better for HT detection than current burst based side channels, and the results in Section V-C confirm that.

HT Detection Algorithm

The HT detection algorithm has two phases: training, where a circuit that is known to be HT-free is characterized, and detection, where an unknown circuit is classified into one of the two categories—HT-free or HT-afflicted, according to how much its measurements deviate from the statistics learned in training.

Figure 11:
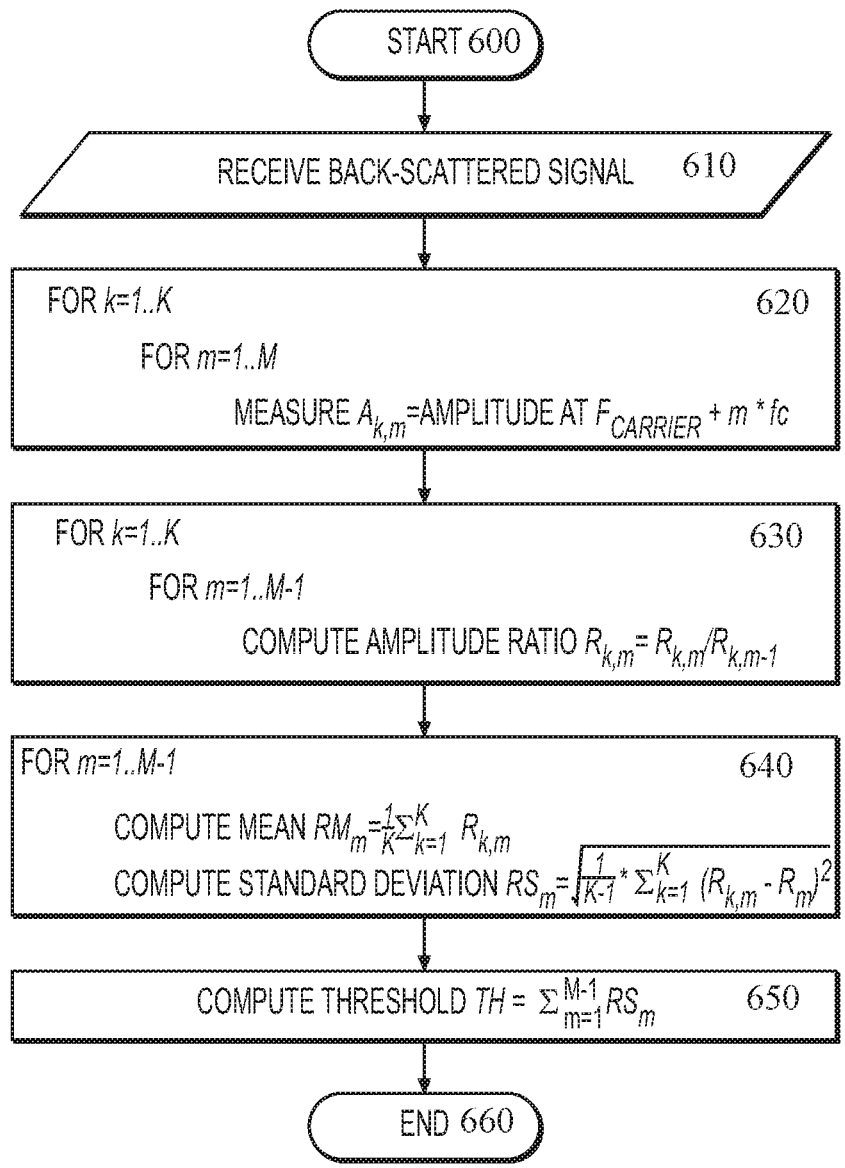
FIG. 11 is an example flow chart of a training algorithm as described herein.

I) Training: FIG. 11 details the training for the prototype implementation of backscattering-based HT detection. This training noted in steps 600-660 consists of measuring K times the signal backscattered from an IC known to be HT-free, each time collecting the m amplitudes at frequencies that correspond to the lowest m harmonics of the IC's clock frequency in the side-band of the received backscattered signal. The m−1 amplitude ratios are then computed from these amplitudes. Next, for each of the m−1 amplitude ratios, the mean and standard deviation across the M measurements is computed, and the detection threshold for HT detection is computed as the sum of the m−1 standard deviations.

C. Detection

Figure 12:
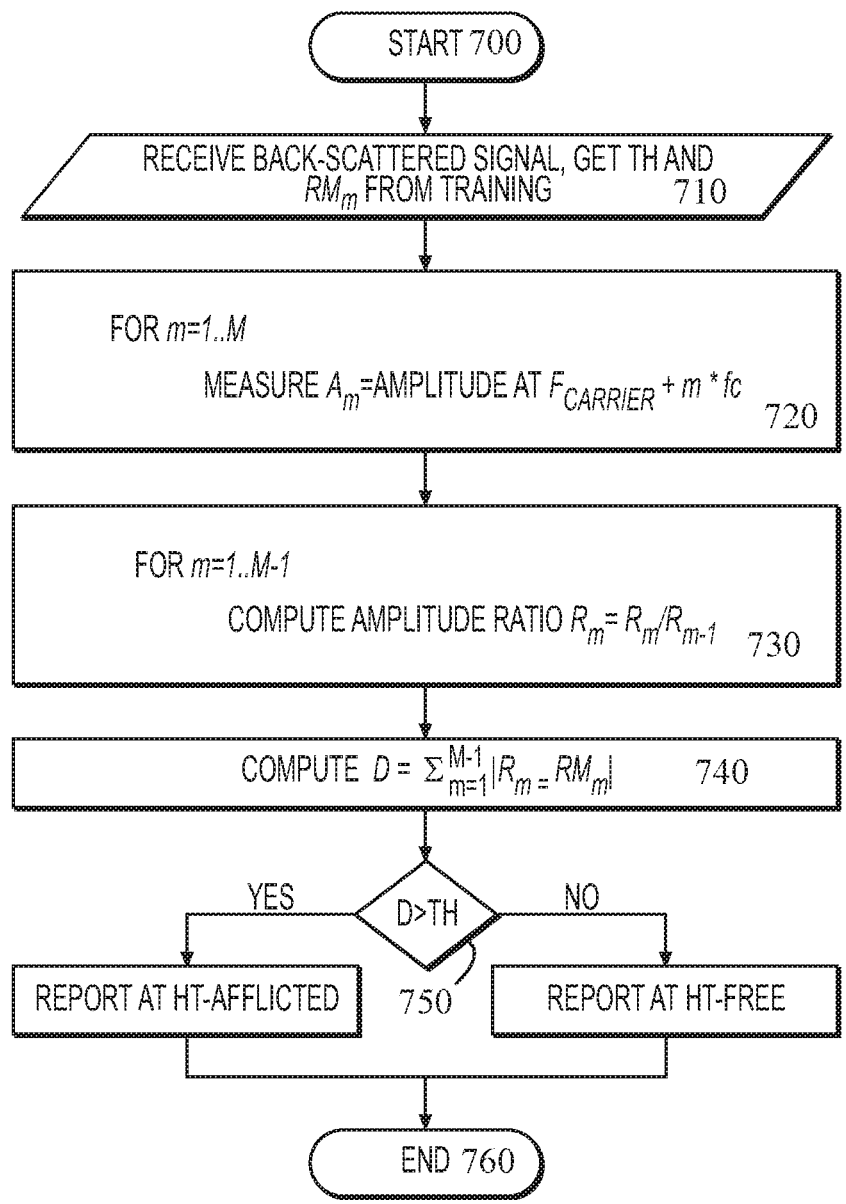
FIG. 12 is an example flow chart of a detection algorithm as described herein.

FIG. 12 details in steps 700-760 how the prototype implementation of backscattering detection decides whether to classify an IC as HT-free of HT-afflicted. First, a single measurement is obtained of the m amplitudes that correspond to the lowest m harmonics of the IC's clock frequency in the side-band of the signal that is backscattered from the IC under test, and "m−1" amplitude ratios are computed from these amplitudes. Next, for each of the m−1 amplitude ratios, we compute how much it deviates from the corresponding mean computed during training. This deviation is computed as the absolute value of the difference, and intuitively it measures how much that amplitude ratio differs from what would be expected from an HT-free IC. Finally, this sum of these deviations is compared to the sum of standard deviations from training. Intuitively, the sum of the differences for the IC under test is a measure of how much its overall backscattering "signature" differs from what would be expected from an HT-free IC, and the sum of standard deviations from training corresponds to how much an individual measurement of an HT-free IC can be expected to differ from the average of HT-free measurements.

The IC under test is labeled as HT-free if its sum of amplitude ratio deviations is lower than this detection threshold (sum of standard deviations from training). A method of detecting hardware Trojans in a computerized device, therefore, incudes identifying a clock frequency $f_{clock}$ of at least one digital circuit in a computerized device, interrogating the digital circuit with an incident carrier wave comprising a carrier frequency $f_{carrier}$, receiving a modulated backscatter response from the digital circuit at a computerized detection device, using the modulated backscatter response, generating an amplitude trace of a time domain or frequency domain analysis for a plurality of harmonics of the clock frequency modulating the carrier frequency, and comparing the amplitude trace of the digital circuit with a standardized amplitude trace to identify characteristics of the harmonics indicative of a presence or an absence of a hardware Trojan connected to the digital circuit.

The above described computer generates the standardized amplitude trace by performing the identifying, interrogating, receiving, and generating steps on a trusted computerized device free of hardware Trojans, wherein generating the standardized amplitude trace further comprises, calculating power values at each of the plurality of harmonics of the clock frequency $f_{clock}$ of the digital circuit, computing a power amplitude ratio for each harmonic other than the first harmonic, wherein the power amplitude ratio (R) is calculated as Rm=Rm/Rm−1, where m is a power amplitude measurement point, computing a mean value of the "m−1" power amplitude ratios, and computing a respective standard deviation (RSm) for the "m−1" power amplitude ratios. Finally, the above described computer incorporates appropriate software and processing ability to compute a threshold (TH) as the sum of the respective standard deviations, wherein the threshold (TH) represents a comparison value over which a calculated threshold (THc) for a device under test indicates the presence of a hardware Trojan.

Using a computer, software, and appropriate software allows for forming the standardized amplitude trace by performing the identifying, interrogating, receiving, and generating steps on a plurality of computerized devices comprising respective versions of the at least one digital circuit, wherein generating the standardized amplitude trace further comprises, for each of the computerized devices, calculating power values at each of the plurality of harmonics of the clock frequency $f_{clock}$ of the at least e digital circuit, grouping the computerized devices according to common power values at selected harmonics, and identifying suspect computerized devices from the grouping according to the common power values.

A method of this disclosure further includes, for each grouping of computerized devices computing a power amplitude ratio for each harmonic other than the first harmonic, wherein the power amplitude ratio (R) is calculated as Rm=Rm/Rm−1, where m is a power amplitude measurement point; computing a mean value of the "m−1" power amplitude ratios; computing a respective standard deviation (RSm) for the "m−1" power amplitude ratios; and computing a threshold TH as the sum of the respective standard deviations, wherein the threshold (TH) represents a comparison value over which a calculated threshold (THc) for a computerized device under test indicates the presence of a hardware Trojan. The amplitude trace corresponds to amplitudes at the frequencies of the harmonics of the device's clock, and in one embodiment, the characteristics of the harmonics in the device under test are affected by a size of a trigger portion of a hardware Trojan to a greater degree than a corresponding size of a payload portion of a hardware Trojan.

Backscattering Side Channel Measurement Setup

Figure 13:
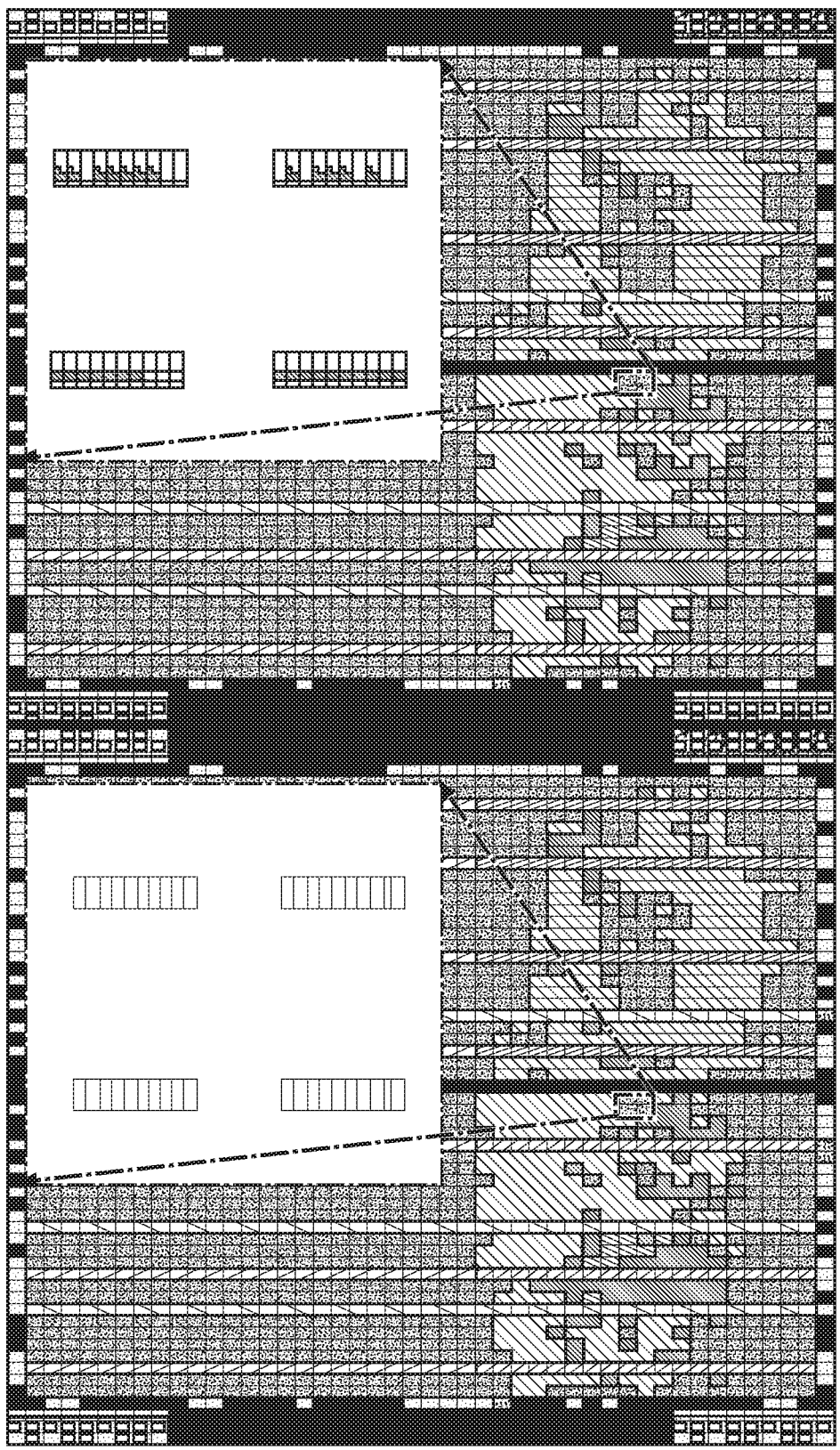
FIG. 13 is a simulated scan of computer activity on a genuine AES circuit (left) and a hardware Trojan infected AES circuit (right).

FIG. 13 shows the measurement setup that the embodiments use to evaluate the performance of the proposed prototype backscattering based HT-detection The setup for the proposed technique to detect HTs is shown in FIG. 13, The carrier signal is a sinusoid at f carrier=3.031 GHz produced by an Agilent MXG N5183A signal generator and transmitted toward the FPGA chip using an electric-field near-field probe. To select fcarrier, the embodiments have measured signal strength at the frequency of the reflected carrier signal (the signal the embodiments were injecting into the board), the first several harmonics of the modulated FPGA board clock (e.g. 50 MHz away from the carrier), and of the noise floor of the instrument using Near Field Probes (0 to 10 GHz). This disclosure shows that the side-band signal for the first harmonic of the board's clock is strongest when fcarrier is around 3 GHz, but the embodiments also found that traditional EM emanations create interference at frequencies that are multiples of the board's clock frequency (50 MHz), Thus the embodiments choose fcarrier=3,031 GHz, a frequency close to 3 GHz that avoids interference from the board's traditional EM emanation. The device-under-test (DuT) is the FPGA chip on the Altera DE0-CV board, and it is positioned using a light-angle ruler so that different DE0-CV boards can be tested using approximately the same position of probes. The backscattered signal is received with an Aaronia H2 magnetic field near-field probe, and this signal was pre-amplified using an EMC PBS2 low-noise amplifier and then the signal amplitudes at desired frequencies are measured using an Agilent MXA N9020A Vector Signal Analyzer.

Training and Testing Subject Circuit Designs

All circuits used in the experiments are implemented on a Field Programmable Gate Array (FPGA), which allows rapid experimentation by changing the circuit and/or its physical placement and routing, unlike hard-wired ASIC designs that would require fabrication for each layout variant of each circuit. The specific FPGA board used is the Altera DE0-CV board, and within it the IC on which the backscattering measurement setup focuses is the Altera 5CEBA4F23C7N, an FPGA in Altera's Cyclone V device family.

For the HT detection experiments, the embodiments use AES-T1800, AES-T1600, and AES-T1 100 hardware Trojan benchmarks from TrustHub [39]. For all three of these HTs, the original HT-free design is an AES-128 cryptographic processor, which uses an 11-stage pipeline to perform the LO stages of AES encryption on 128-bit block. Since numerous HTs in the TrustHub repository are similar to each other, the embodiments selected these three HT benchmarks because they exhibit different approaches for their triggers and payloads:

T1800: The payload in this HT is a cyclic shift register that, upon activation, continuously shifts to increase power drain consumption, which would be a serious problem for small battery-powered or energy-harvesting devices in e.g., medical implants. The HT's trigger circuit consists of combinatorial logic that monitors the 128-bit input of the AES circuit, looking for a specific 128-bit plain text value, and the occurrence of that 128-bit value at the input activates the payload. The size of T1800's trigger circuit is 0.27% of the original AES circuit, and the size of its payload is 1.51% of the size of the AES circuit. Because this HT's trigger and payload can be resized easily, the embodiments use this HT to study how HT detection is affected by HT size and physical location.

T1600: The payload in this HT creates activity on an otherwise-unused pin to generate an RF signal that leaks the key of the AES circuit. The HT's trigger circuit consists of sequential logic which activates the payload when a pre-defined sequence of values is detected at input of the AES circuit. The size of T1600's trigger circuit is 0.28% of the size of the original AES circuit, while the size of its payload is 1.76% of the size of the original AES circuit.

T1100: The payload of this HT modulates its activity using a spread-spectrum technique to create a power consumption patterns that leaks the AES key. The trigger is a (sequential) circuit that looks for a predefined sequence of values at the input of the AES circuit to activate the payload. The size of T1800's trigger circuit is 0.28% of the size of the original AES circuit, while the size of its payload is 1.61% of the size of the AES circuit.

A key challenge the embodiments faced when implementing the HT-afflicted circuits was that these HTs are specified at the register-transfer level, as modifications to the original AES circuit's Verilog HDL source code. If the modified source code is subjected to the normal compilation, placement, and routing, the embodiments found that the addition of the HT causes the EDA tool to change the placement and routing of most logic elements in the overall circuit, and this extensive change makes the modification very easy to detect regardless of the HT's actual size and activity. The next approach the embodiments tried was to compile the AES circuit using the normal compilation, placement, and routing, and then for each HT-afflicted design the embodiments used the ECO (Engineering Change Order) tool in Altera's Quartus II suite to add the HT's circuitry while leaving unchanged the placement of logic elements (and the routing of their connections) that belong to the original AES circuit. However, the embodiments found that this approach makes it very hard to place the HT's logic elements close to the inputs of the original AES circuit, and (as will be demonstrated in Section V-E), the HT is easier to detect when its trigger is placed away from where it is connected to the original circuit.

Figure 14:
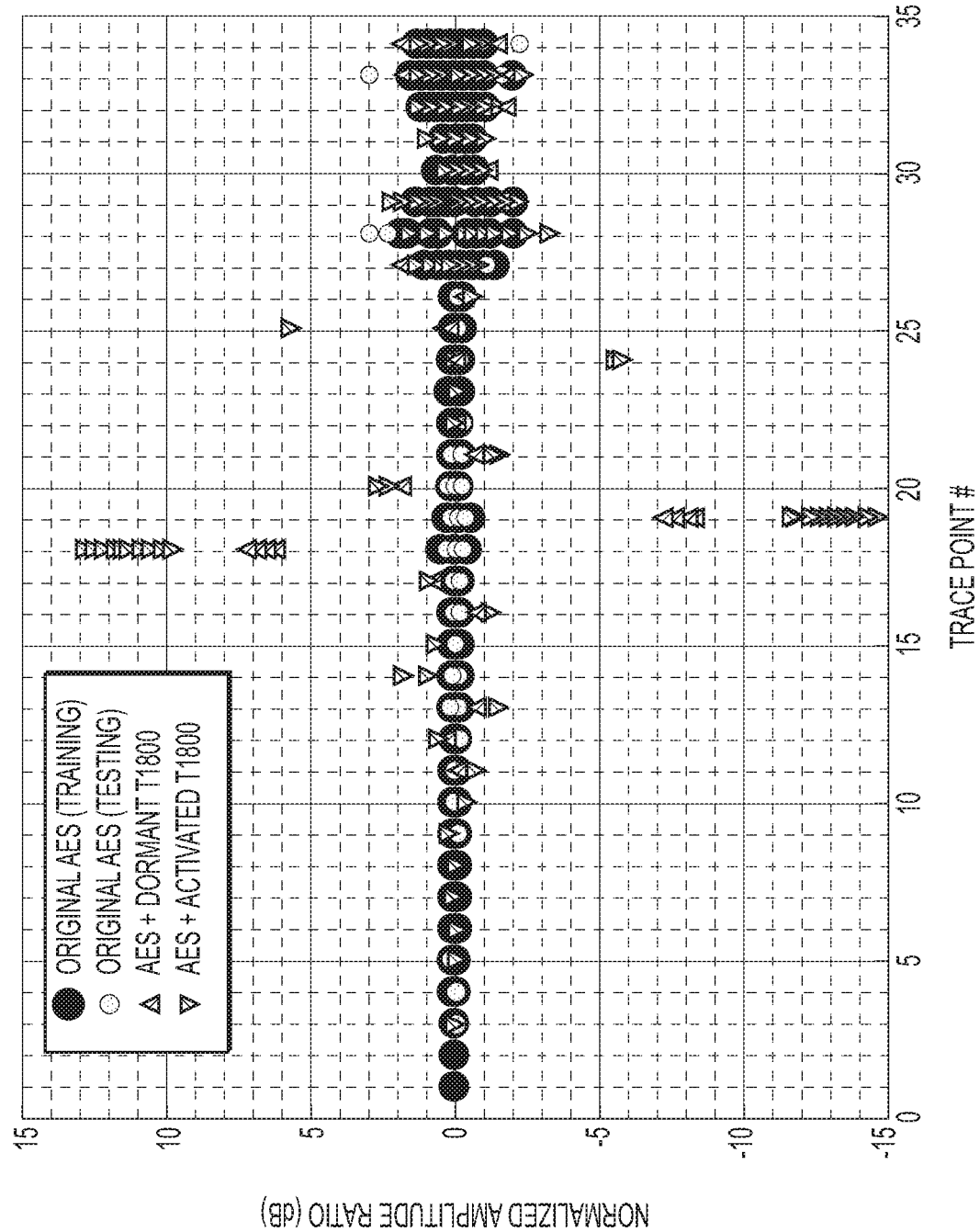
FIG. 14 is an example plot of normalized amplitude ratios for backscattering side channel measurements.

To make the HTs more stealthy, the embodiments instead compile, place, and route the HT-afflicted circuit, then create the HT-free circuit by removing (using the ECO tool) the HT's logic elements and their connections. This models the HT "dream scenario" for the malicious entity that wishes to insert the HT, as there is just enough space in the HT-free layout to insert the HT in just the right place to have very short connections to the original circuit. To illustrate this, the placement of the HT-free circuit and the T1800-afflicted circuit are shown in FIG. 14, with a zoom-in to show the details where the HT's logic elements are placed.

Finally, for HT detection, the circuit must be supplied with inputs during the evaluation. Since the embodiments evaluate the HT detection approach in the dominant-HT scenario, any input sequence that causes logic gates in the original AES circuit to change state can be used, so each cycle the embodiments simply flip all of the AES circuit's input bits. Note that hexadecimal 3 and C correspond to binary 0011 and 1100, while hexadecimal A and 5 correspond to 1010 and 0101, respectively. Thus the inputs the embodiments feed to the AES circuit simply toggle each of the input bits, while avoiding all-ones and all-zeros patterns. Because it is very difficult to activate an HT without a priori knowledge of its trigger conditions, it is highly desirable for an HT detection scheme to provide accurate detection of dormant HTs, i.e., to detect HTs whose payload is never activated while it is characterized by the HT detection scheme. However, a dormant HT is typically more difficult to detect compared to an activated HT. For side channel-based detection methods, in particular, the switching activity in the activated payload, and/or the changes it creates in the switching activity of the original circuit, have more impact on the side channel signal than an inert payload (no switching activity in the payload and no changes to the original circuit's functionality).

Another important practical concern for HT detection is robustness to manufacturing variations and other differences between different physical instances of the same hardware design. Thus the evaluation focuses on detection of dormant HTs with cross-training, i.e. training for HT detection is performed on one hardware instance, and then HT detection is performed on others. The experimental results (Section V-A) show that the prototype backscattering-based HT detection, after training with an HT-free design on one DE0-CV board, accurately reports the presence of dormant HTs, for each of three different HT designs, on nine other DE0-CV boards, while having no false positives when the HT-free design is used on those nine other DE0-CV boards.

Next, the embodiments perform additional experiments to experimentally confirm that dormant HTs are indeed more difficult to detect than activated ones (Section V-B), and also to confirm that a similar detection approach with the traditional EM side channel would still be able to detect activated HTs, but would be unreliable for detection of dormant HTs (Section V-C). Finally, the embodiments experimentally evaluate how the accuracy of dormant-HT detection changes when changing the size (Section V-I)) and physical placement (Section V-E) of the hardware Trojan's trigger and payload components.

Dormant-HT Detection with Cross-Training Using the Backscattering Side Channel Signal This disclosure evaluates the effectiveness of om HT detection prototype by training it on one DE0-CV FPGA board with an HT-free AES circuit, then applying HT detection to several test subject circuits implemented on nine DE0-CV FPGA boards, none of which is the same as the one used for training.

The test subject designs are:
Original AES. This is the same HT-free AES circuit that was used in training, and the embodiments use it to measure the false positive rate of the HT detection.
AES+Dormant T1800. This is the same AES circuit, with the same placement and routing, that was used for training, but with additional logic elements and connections that implement the AES-T1800 Trojan from TrustHub. The size of this HT's trigger (in FPGA logic elements) is 0.27% of the original AES circuit, and the embodiments use a payload that was reduced to only 0.03% of the
original AES circuit. The reduced payload size helps fit this HT closer to where its input signals can be connected to the Original AES circuit, making the HT significantly more difficult to detect (as will be shown in Section V-E).
AES+Dormant T1600. This is the same AES circuit, with the same placement and routing, that was used for training, but with additional logic elements and connections that implement the AES-T1600 Trojan from TrustHub. The size of this HT's trigger is 0.28% of the original AES circuit, while its payload's size is 1.76% of the original AES circuit.
AES+Dormant T1100. This is the same AES circuit, with the same placement and routing, that was used for training, but with additional logic elements and connections that implement the AES-T1100 Trojan from TrustHub. The size of this HT's trigger is 0.28% of the original AES circuit, while its payload's size is 1.61% of the original AES circuit.

For each measurement, the previously measured FPGA board is removed from the measurement setup, and then a different hoard is positioned using an angle ruler to model a realistic measurement scenario when each measurement uses a very similar but not identical relative position of the chip and the probes. Each test subject design is measured 20 times on each board, and each measurement is used for HT detection in isolation, i.e. for each test subject the detection makes 20 classification decisions (HT-free or HT-afflicted) on each of the 9 boards, resulting in a total of 720 decisions. Among these decisions, 180 were on the original AES test subject, and in all 180 of them the prototype has correctly classified the design as HT-free, i.e., the HT detection prototype had no false-positive detections. In the remaining 3 sets of 180 decisions, each test subject's design was HT-afflicted (180 decisions with T1800, 180 decisions with T1600, and 180 with T1 100), and in all of them the prototype has correctly classified the design as HT-afflicted, i.e. the HT detection prototype has detected the presence of an HT in each measurement in which an HT was present.

Since the HT detection prototype using the back-scattering side channel achieves 100% detection of three kinds of dormant HTs, with 0% positives, in the cross-training measurement scenario, the embodiments focus the rest of the experimental evaluation on getting more insight into why the HT detection performs so well and how sensitive it is to changes in the position and size of the HT.

HT Detection of Dormant Vs. Active HTs Using the Backscattering Side Channel

Figure 15:
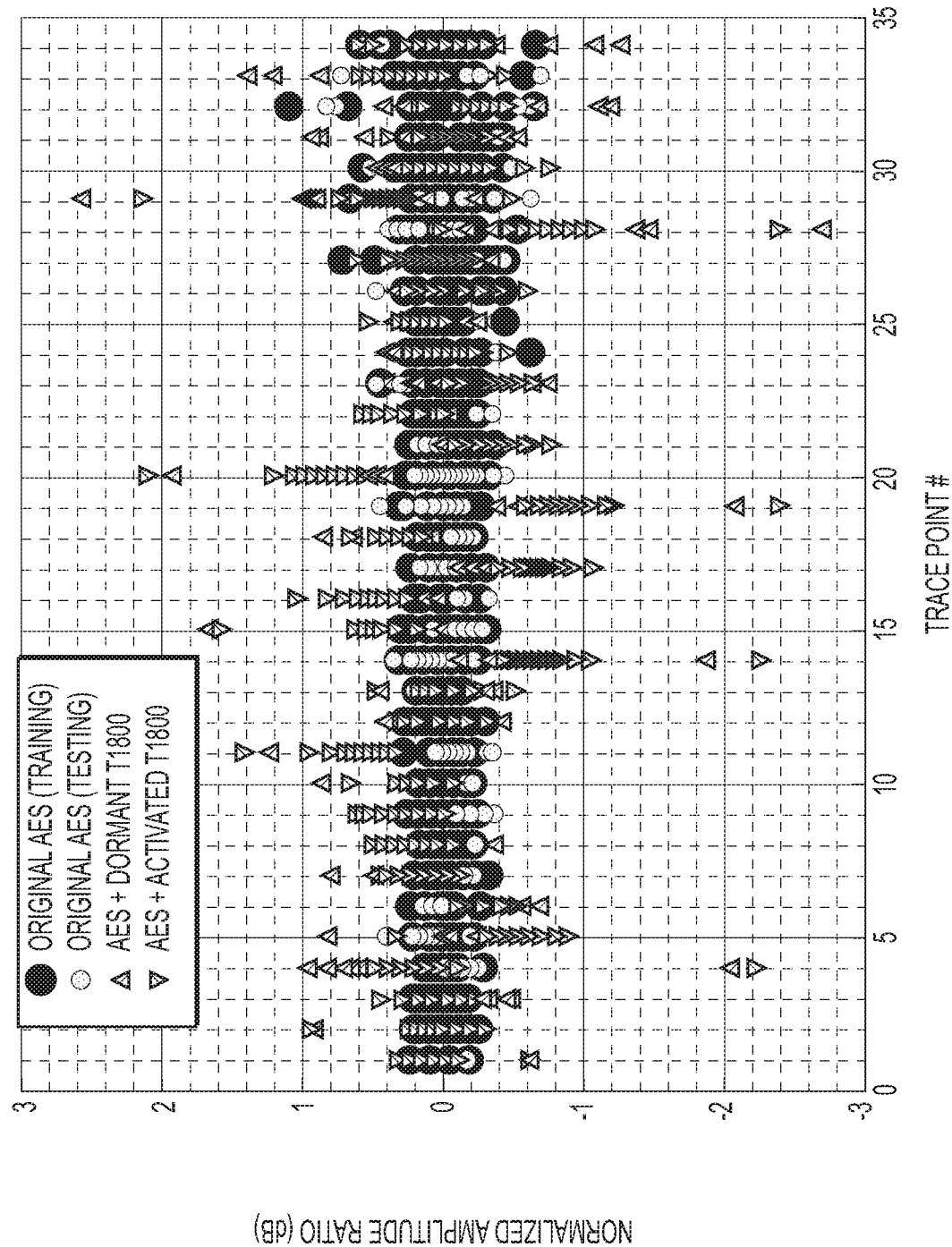
FIG. 15 is an example plot of normalized amplitude ratios for traditional electromagnetic side channel measurements.
Figure 16:
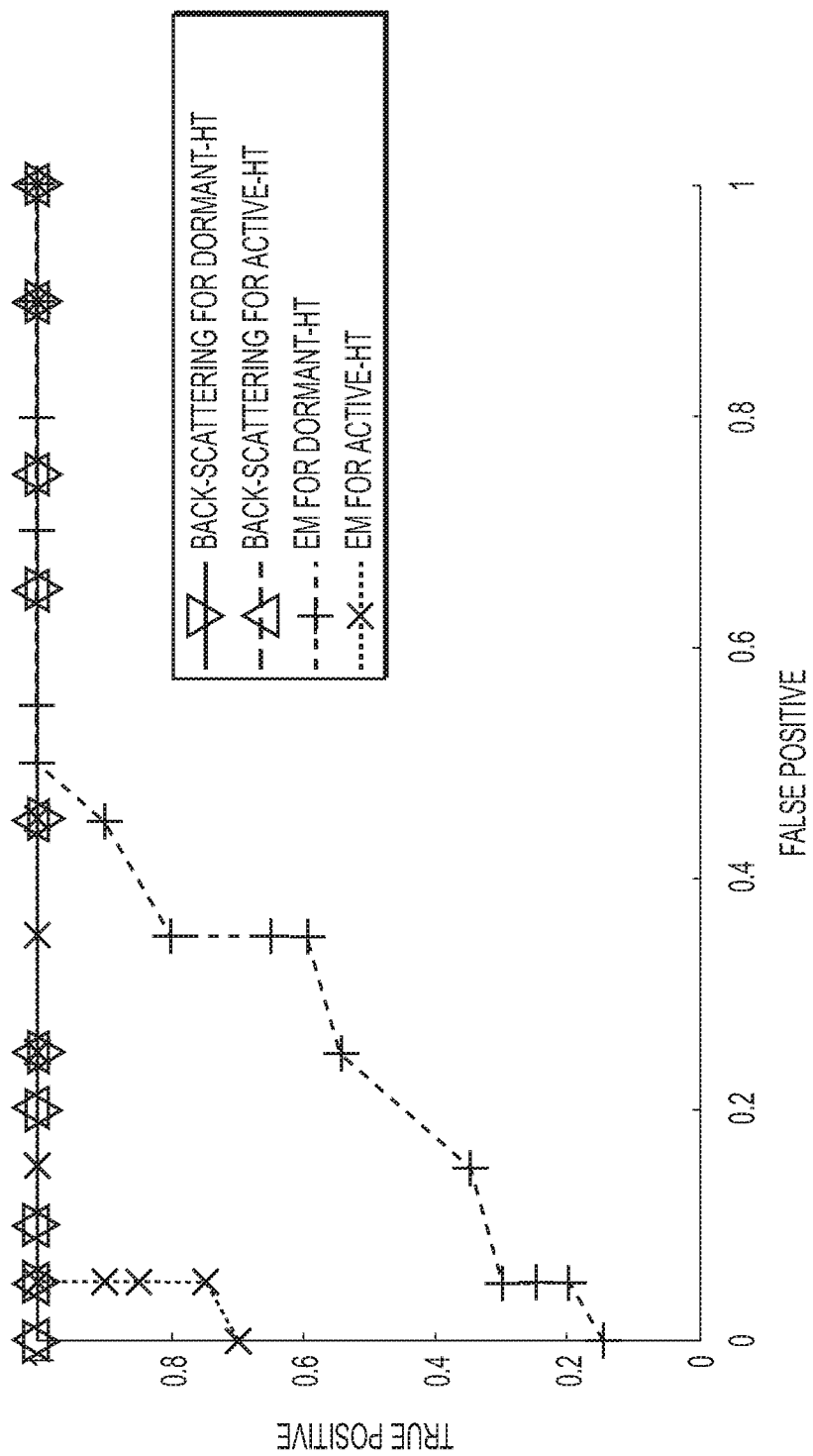
FIG. 16 is an example plot of detection performance (ROC curve) comparison of backscattering-based and EM-based detection in active-HT and dormant-HT scenarios.

FIG. 15 compares the normalized amplitude ratios for an HT free AES design and for the same AES design (and layout) to which the AES-71800 Trojan has been added. Two separate sets of 20 measurements are shown for the HT-free design, one that is used for training and one that is used to detect false positives when evaluating HT detection (on another DE-OCV board). For the HT-afflicted design, one set of 20 measurements is collected when the HT is dormant (its payload has not been activated), and another set of 20 measurements is collected with the same HT after its payload is activated. The embodiments can observe that there are a number of trace points where both sets of HT-afflicted measurements deviate significantly from HT-free measurements, and that this deviation tends to be larger for measurements in which the HT has been activated. The higher deviation from HT-free measurements seen for active-HT measurements agrees with the intuitive reasoning that an HT is easier to detect when active than when it is dormant. Even so, the backscattering-based HT detection prototype successfully reports the existence in each dominant-HT experiment (100% detection rate), while correctly reporting all 20 HT-free measurements as HT-free (no false positives).

Comparison to EM-Based HT Detection

Figure 17:
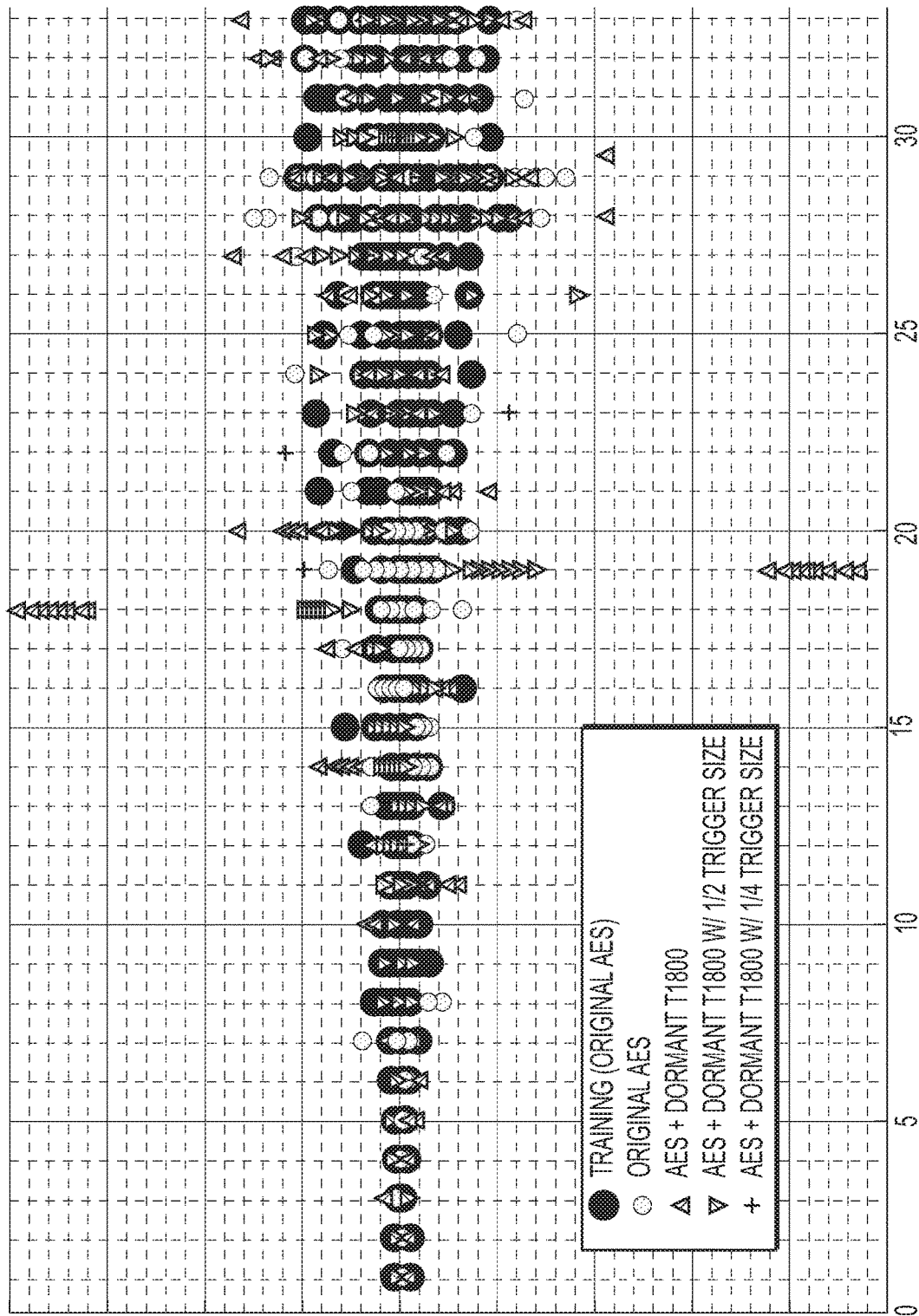
FIG. 17 is an example plot of normalized amplitude ratios for different sizes of T1800's trigger input.

As discussed in Section ill, the impedance-based backscattering side channel should be more effective for HT detection than existing current-burst-based (e.g. traditional EM) side channels. To confirm this, the embodiments repeat the same experiment, but this time use amplitudes of EM emanations at the clock frequency and its harmonics, instead of using the clock-frequency harmonics in the side-bands of the backscattered signal. The normalized amplitude ratios from these measurements are shown in FIG. 17. The embodiments can observe that the HT-afflicted measurements are much less separated from HT-free ones than they were with backscattering—for most trace points even active-HT measurements are all within ±1 dB from the HT free ones, although for several trace points there is still some separation between the active-HT and HT-free measurements. More importantly, nearly all dormant-HT measurements have a lot of overlap with HT-free measurements, which makes the dormant-HT measurements difficult to distinguish from HT free ones.

Figure 18:
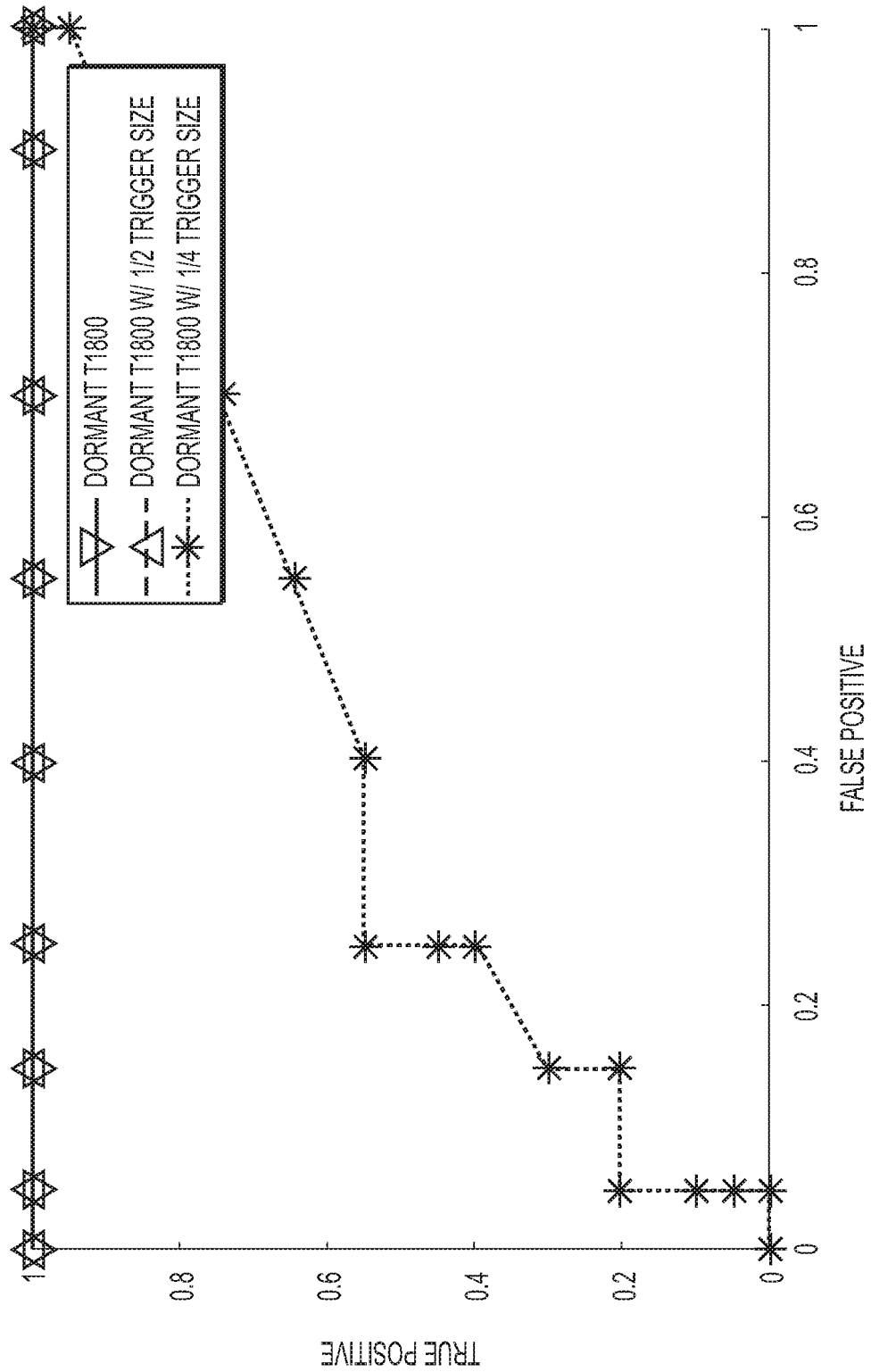
FIG. 18 is a set of example ROC curves for HT detection for different sizes of the HT's trigger circuit.

This is confirmed by the results of applying the HT detection prototype to these measurements. The ROC (Receiver Operating Characteristic) curves for HT detection using backscattering and EM side channels are shown in FIG. 18. Backscattering-based detection correctly identifies the presence of an HT in each HT-afflicted measurement, without false positives in HT-free measurements, in both active-HT and dormant-HT scenarios. In contrast, detection based on the EM side channel performs less well in the active-HT case, reporting only 70% of the active-HT measurements as HT-afflicted using the default threshold (which produces no false positives).

More importantly, EM-based detection in the dormant-HT case performs poorly—in the absence of false positives, only 15% of the dormant-HT measurements are correctly reported as HT-afflicted, and when the detection threshold is reduced to a point where all dormant-HT measurements are reported as HT afflicted, 50% of the HT-free measurements are also reported as HT-afflicted (a 50% false-positive rate). In conclusion, these experiments indicate that the HT detection technique's ability to detect dormant HTs comes, at least in large part, from using the backscattering (impedance-based) side channel instead of traditional current-based (EM and power) side channels.

Impact of Hardware Trojan Trigger and Payload Size

To provide more insight into which factors influence the HT detection prototype's ability to detect dormant HTs, the embodiments perform experiments in which the embodiments reduce the size of the T1800 hardware Trojan's trigger and payload. The T1800 was chosen because it has the smallest trigger among the HTs the embodiments used in earlier experiments, and because both its payload and its trigger can be meaningfully resized.

Figure 19:
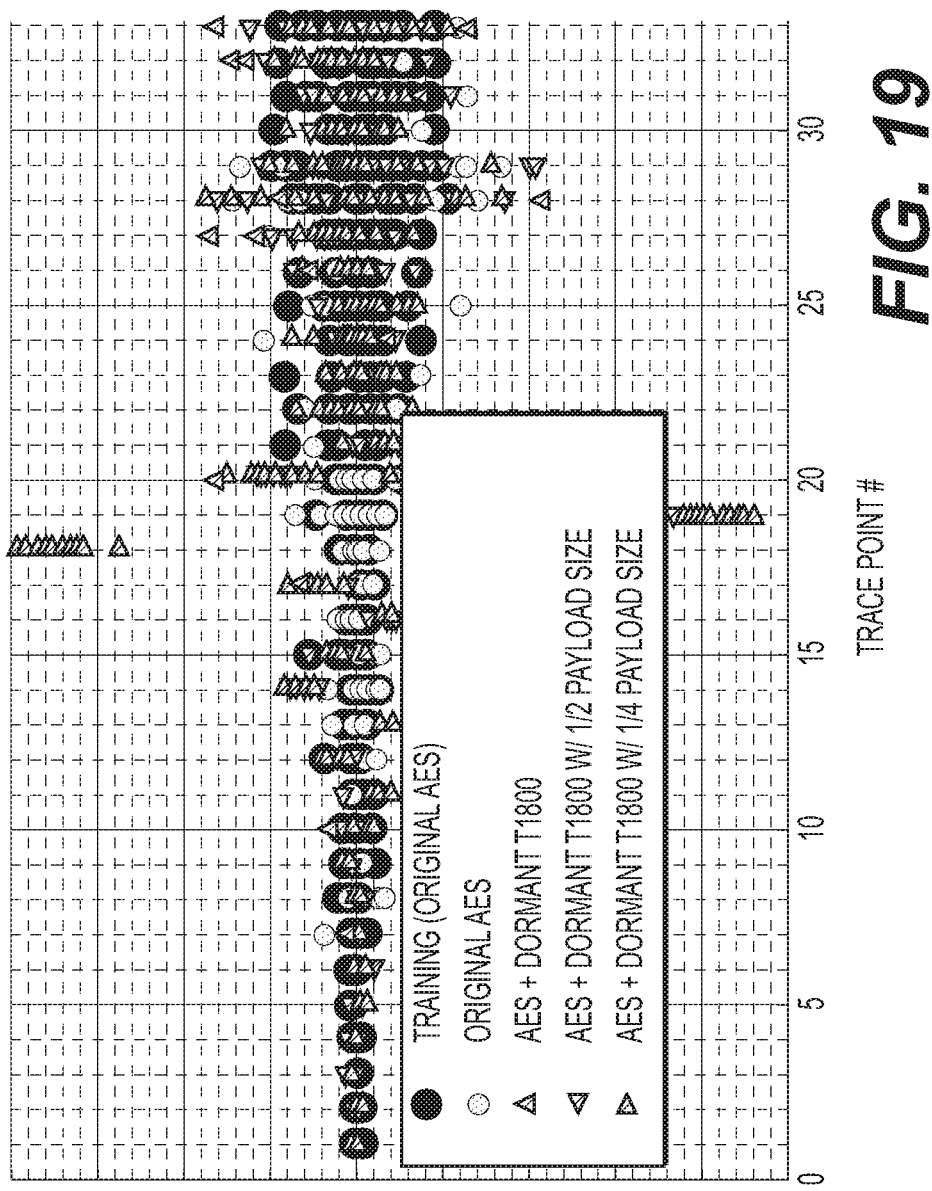
FIG. 19 is an example plot of normalized amplitude ratios for different sizes of T1800's (dormant) payload

The T1800 monitors the 128-bit data input of the AES-128 circuit, comparing it to a specific hard-wired 128-bit value, and it activates the payload when that 128-bit value is detected. In terms of logic elements (gates), the size of this 128-bit trigger is only 0.27% of the size of the original AES circuit, i.e. even this full-size trigger is much smaller than the AES circuit to which the HT has been added, and its activity (while the HT is dormant) is difficult to detect using existing side channels. The embodiments implement reduced-trigger variants of this HT by monitoring only the 64 least significant bits (the ½ trigger size variant, where the trigger circuit size is only 0.15% of the original AES circuit's size), and then only the 32 least significant bits (the ¼ trigger size variant, where the trigger circuit size is only 0.08% of the original AES circuit size). The normalized harmonic ratio traces for 20 measurements of each design, along with 40 HT-free measurements (20 for training and 20 for false-positives testing) are shown in FIG. 19. The embodiments observe that smaller trigger sizes result in trace points that are closer to HT-free ones, i.e. that trigger size directly impacts the side-channel-based separation between dormant-HT and HT free circuits. These results match the intuition that the HT's influence on impedance changes should increase as more input bits are monitored by the HT's trigger, both because of the increased number of connections to the original circuit (which can change impedances "seen" by gates that belong to the original circuit) and because of the increased number of gates whose values can change (switching activity) within a cycle in the HT's trigger circuit itself.

Figure 20:
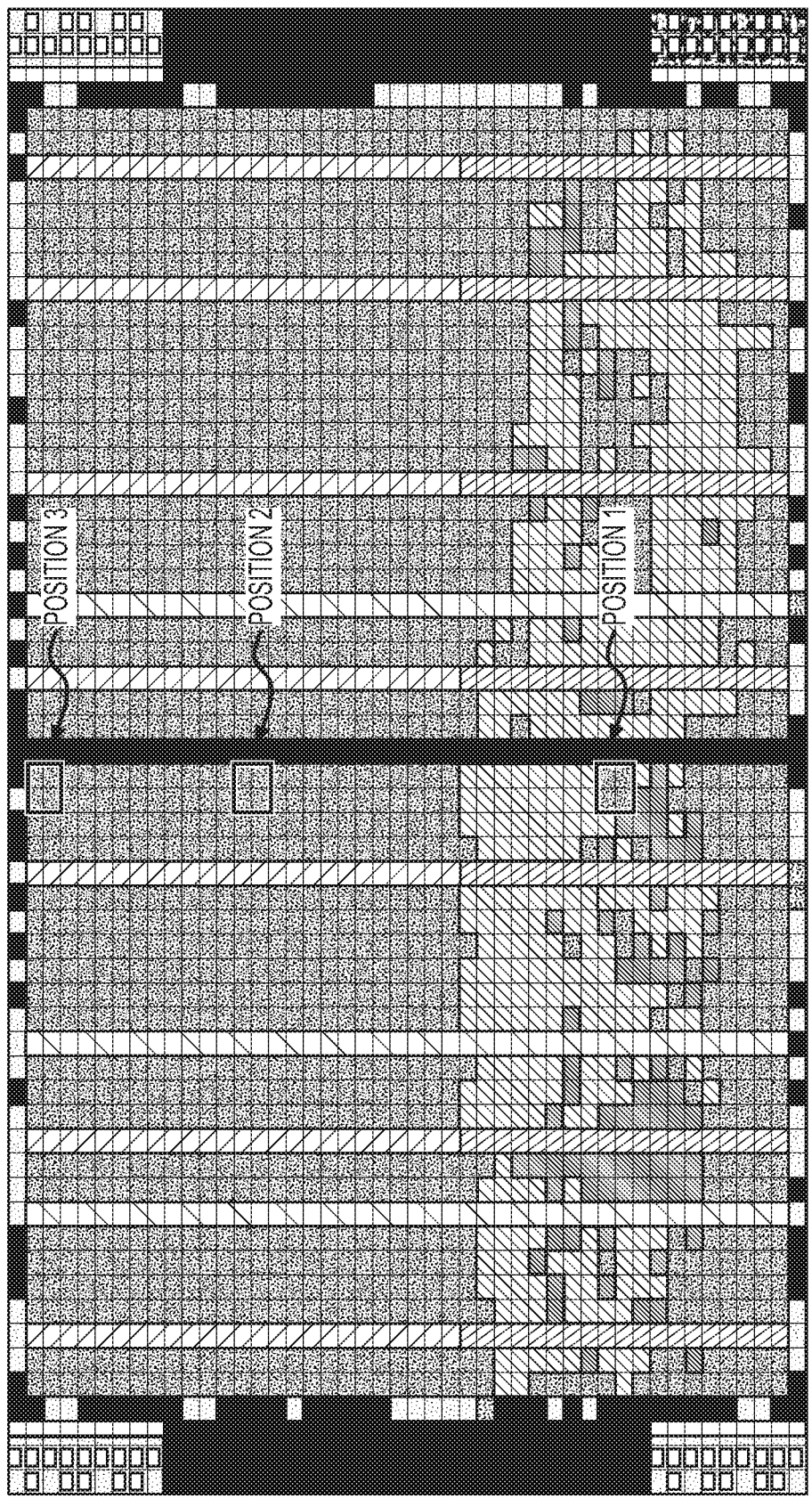
FIG. 20 is an example scan of a digital circuit showing one example of changing the position of the HT trigger logic therein.
Figure 21:
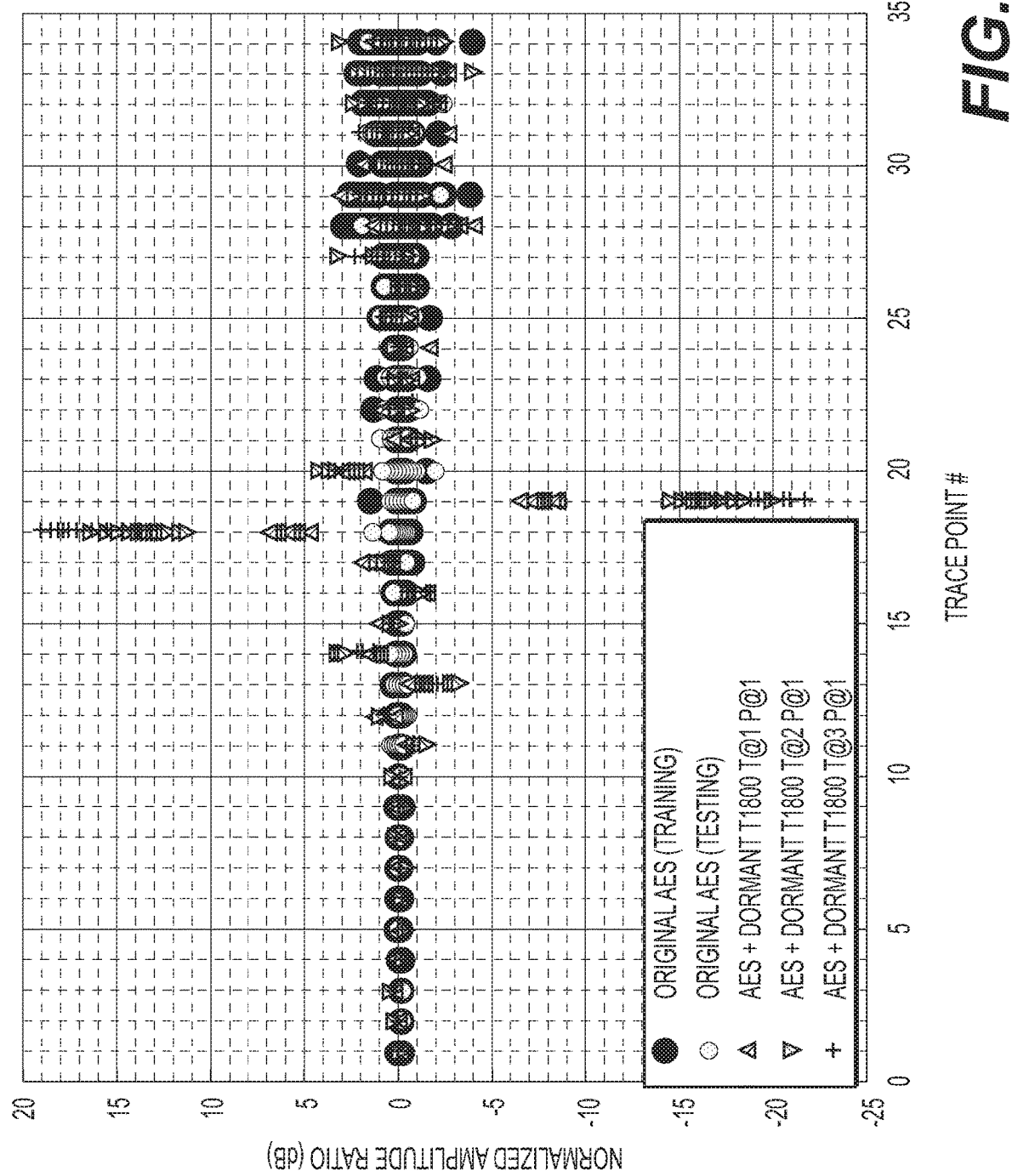
FIG. 21 is an example plot of normalized amplitude ratios for different locations of T1800's trigger logic.

The ROC curves for HT detection with different trigger sizes (FIG. 20) confirm that, while the HT with the original size and even ½-size trigger can be detected each measurement with no false positive, the detection accuracy suffers significantly as the HT's trigger is further reduced to ¼ of the original size. The embodiments perform additional experiments in which we keep the trigger at full size, but reduce the size of the payload to 50% and then 25%. The dormant-HT measurement results for these variants are not noticeably different from each other (FIG. 21), which implies that the payload size has little impact on the HT detection. This agrees with the theoretical and intuitive expectations: the payload in T1800 has little impact on the impedance changes during a clock cycle, as it has no switching activity (until activated), and has no connections to the gates in the original AES circuit (T800's payload is designed to produce a lot of power-draining switching activity upon activation, not to change the functionality of the AES circuit). Since the measurements of the full-trigger-and-reduced payload variants of T1800 HT are very similar to the full-size T1800 HT, they provide the same ROC curves (complete detection without false positives) as the full-size T1 800 HT, as shown in FIG. 20.

E. Impact of HT Trigger and Payload Position

Figure 22:
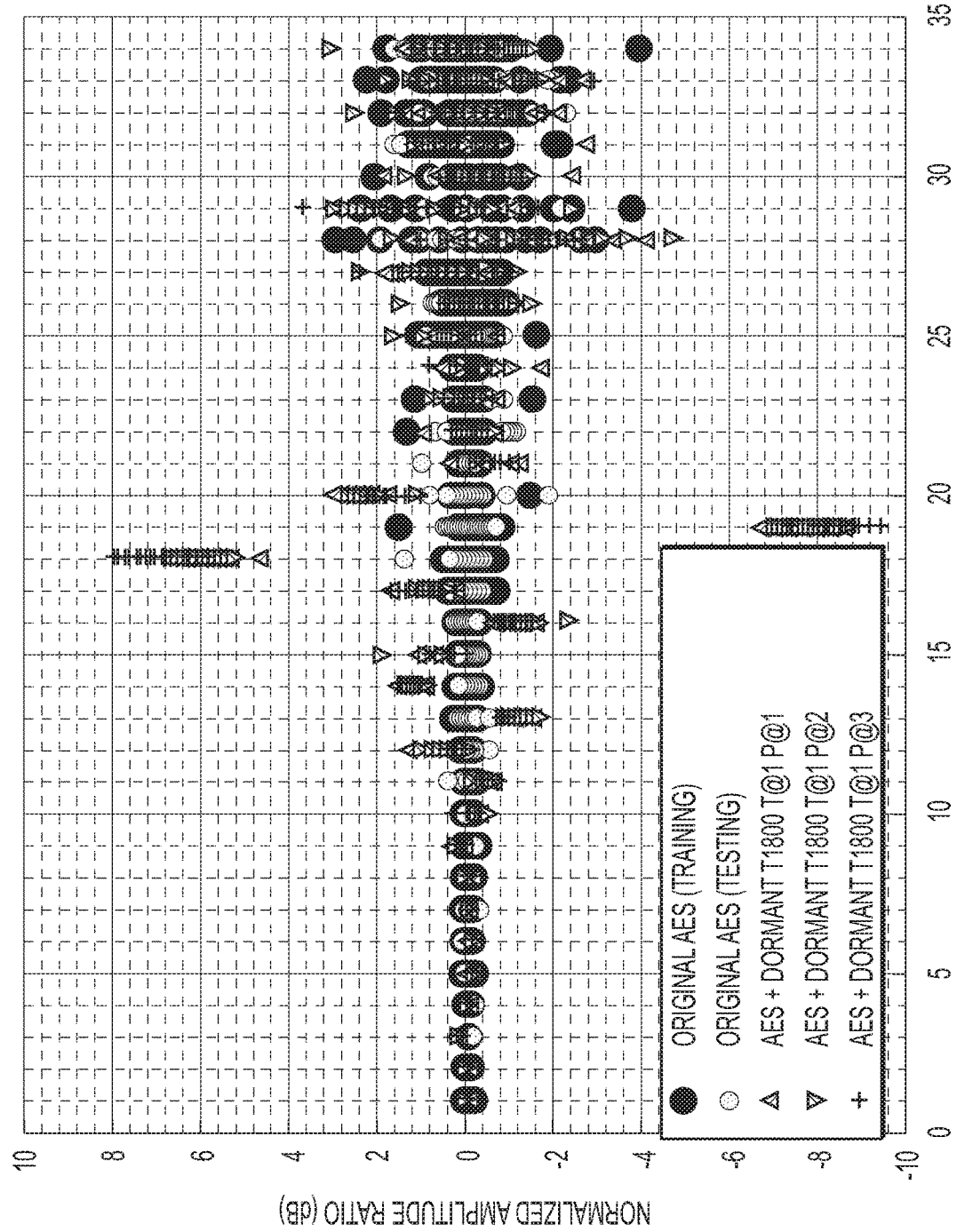
FIG. 22 is an example plot of normalized amplitude ratios for different locations of T1800's (dormant) payload.

The embodiments next investigate how the backscattering-based HT detection is influenced by the physical location and routing of the HT's connection to the minimal circuit. For this, the embodiments start with the AES circuit with the T1800 HT, whose trigger logic was placed at Position 1 shown in FIG. 22 by the placement and routing tool very close to where its 128-bit input can be connected to the original AES circuit. The embodiments then create a variant of this HT by moving the HT's trigger logic to Position 2, keeping the logic elements and the connections between them in the same position relative to each other, but making the trigger's 128 connections to the original AES circuit much longer. Another variant is similarly created by moving the HT's trigger logic to Position 3.

Figure 23:
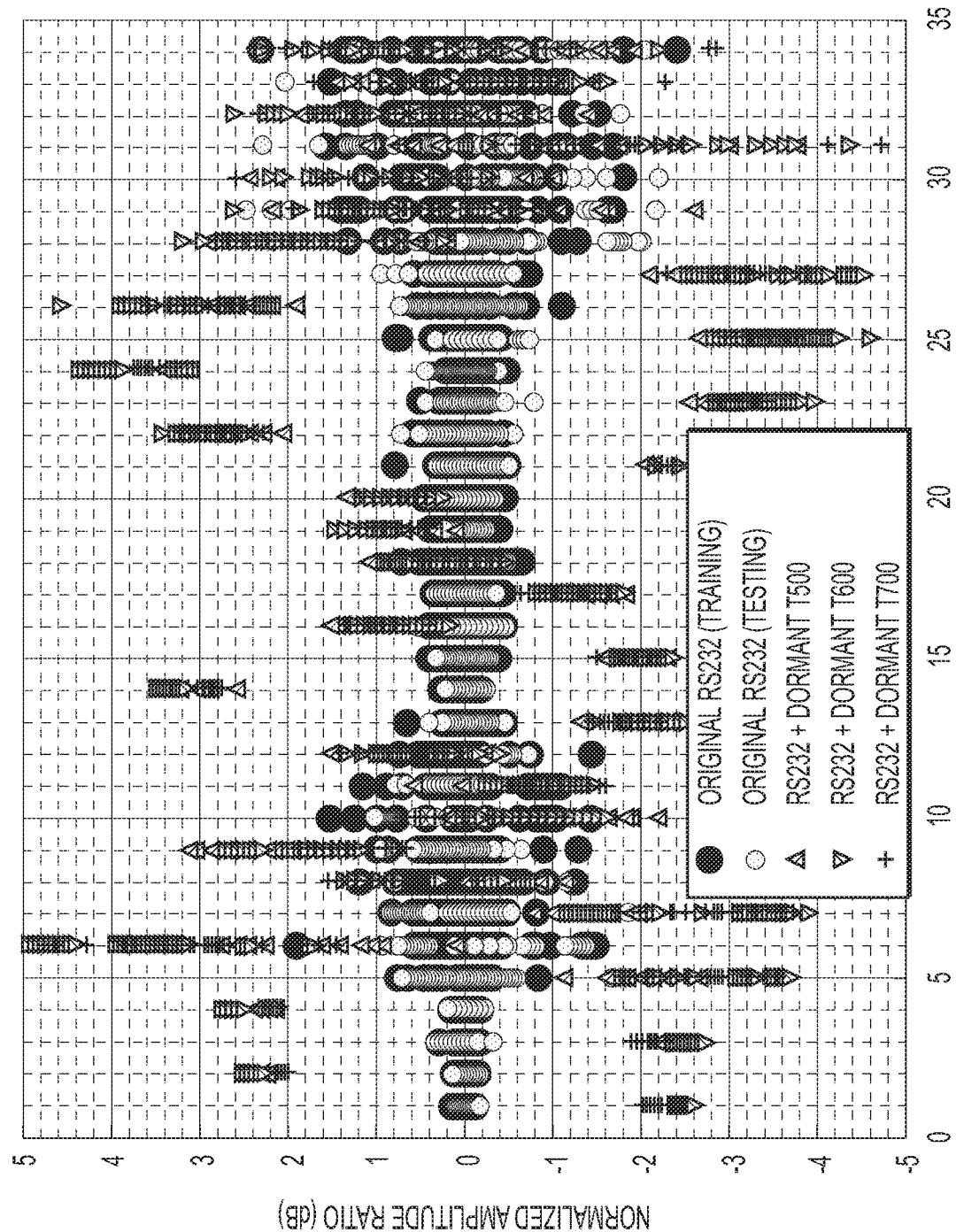
FIG. 23 is an example plot of normalized amplitude ratios for different HTs in the RS232 circuit.
Figure 24:
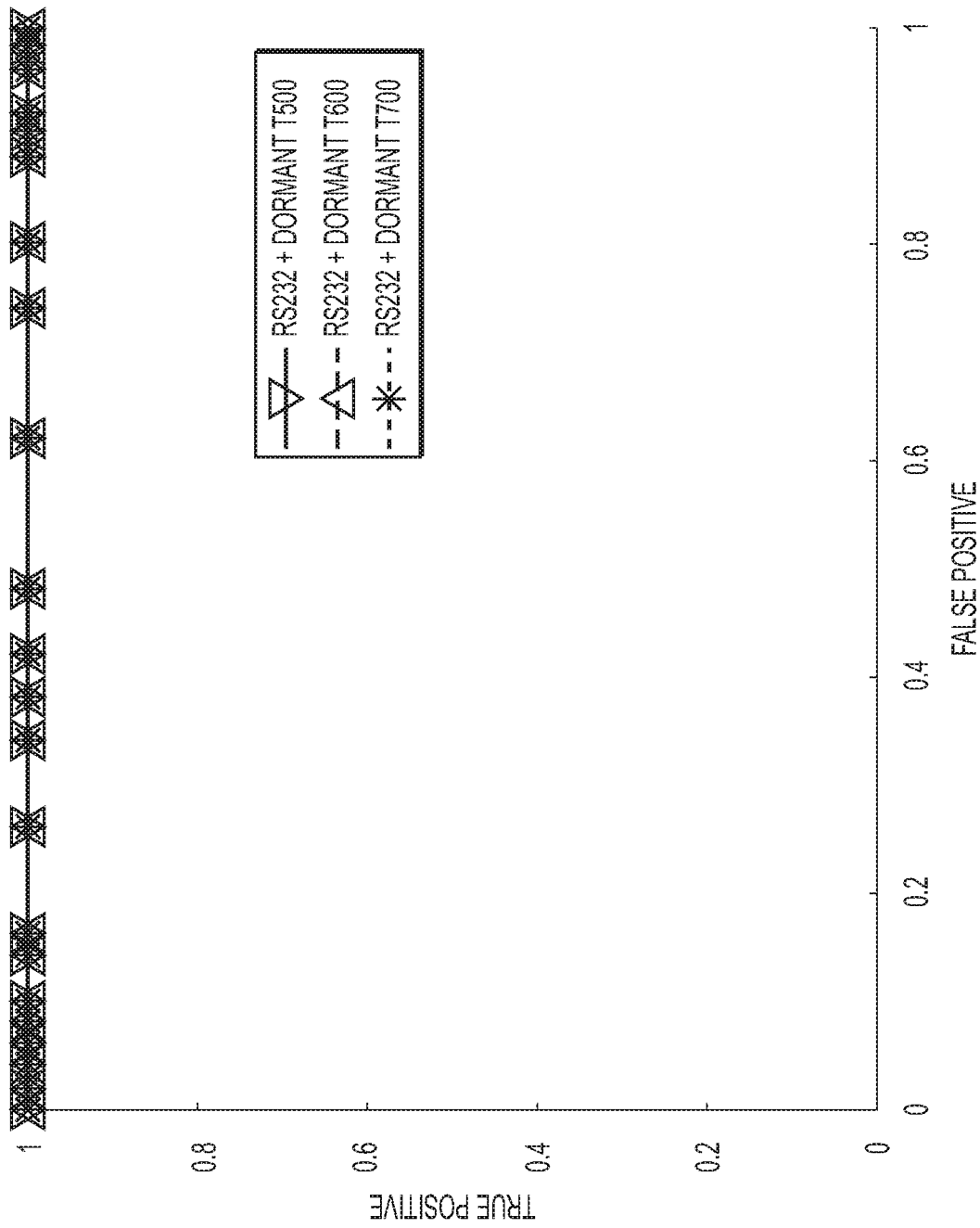
FIG. 24 is a set of example ROC curves for detection of HTs in the RS232 circuit.

The dormant-HT measurement results for these three positions are shown in FIG. 23. The embodiments observe that, at many trace points, in terms of separation of HT-afflicted measurements from HT-free ones, Position 2 is significantly more separated than Position 1, and Position 3 provides an additional small increase in separation. This means that HTs placed close to their connection points in the original circuit are more difficult to detect than HTs that require long connections. All of the prior experiments used HTs that were placed by the placement and routing tool in a way that attempts to minimize overall cost (which tends to minimize the total length of the HT's connections to the original circuit), the embodiments can thus expect the Position 2 and Position 3 variants to also be detected correctly in each dormant-HT measurement (with no false positives in HT-free measurements), and the HT detection results confirm this.

The embodiments also performed experiments in which the trigger part of the HT is kept in Position 1, while its payload was moved to Position 2 and then Position 3. The results show that the payload position has little impact on the measurements, which is as expected given that, in the dormant-HT experiments, the 1-bit "activate" signal between the trigger and the payload never changes its value (it stays at 0, i.e. inactive), and that the payload has no switching activity.

F. Further Evaluation of HT Detection Using More Benchmarks

To further evaluate the effectiveness of the HT detection prototype, the embodiments implement two different circuits, RS232 and PIC16F84, each with three HTs, from TrustHub [39]. The embodiments use the same HT detection prototype described in Section III-B and the setup described in Section IV.

1) RS232 circuit: The embodiments use RS232-T500, RS232-T600, and RS232-1700 HT benchmarks from Trust-Hub [39]. For all three of these HTs, the original HT-free design is a RS232 micro-UART core consisting of a transmitter and a receiver. The transmitter takes input words (128-bit length) and serially outputs each word according to the RS232 standard, while the receiver takes a serial input and output 128-bit words a) RS232-T500: The payload in this HT is a circuit that, upon activation, causes the transmission to fail. The trigger is sequential circuit that increments its counter every clock cycle, and activates the payload activated when this counter reaches a certain value. The size of the trigger circuit is 1.67%, and the size of the payload circuit is 1.48% of the size of the RS232 circuit.

b) RS232-T600: The payload in this HT is a circuit that, upon activation, makes the transmitter's "ready" signal become stuck-at-1, and changes specific bits in the transmitted data. The trigger is a sequential circuit that looks for a specific sequence of UART states to activate the payload. The size of the trigger circuit is 1.54%, and the size of the payload circuit is 1.52% of the size of the RS232 circuit.

c) RS232-1700: The payload of this HT is a circuit that, upon activation, makes the transmitter's "finished" signal become stuck-at-0. The trigger is sequential circuit that looks for a predefined sequence of UART states to activate. The size of the trigger circuit is 1.54%, and the size of the payload circuit is 1.48% of the size of the RS232 circuit.

Figure 25:
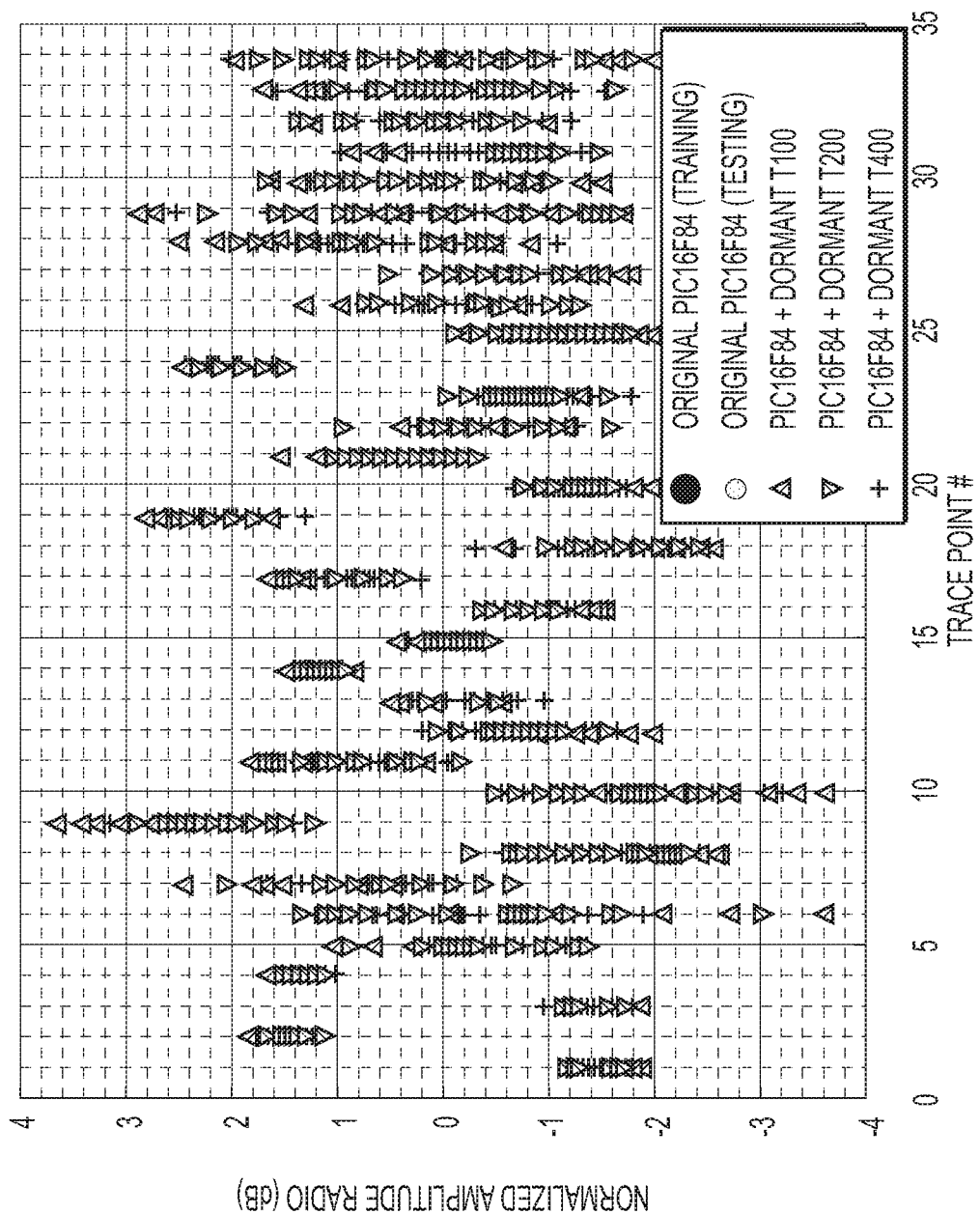
FIG. 25 is an example plot of normalized amplitude ratios for different HTs in the PIC16F84 circuit.
Figure 26:
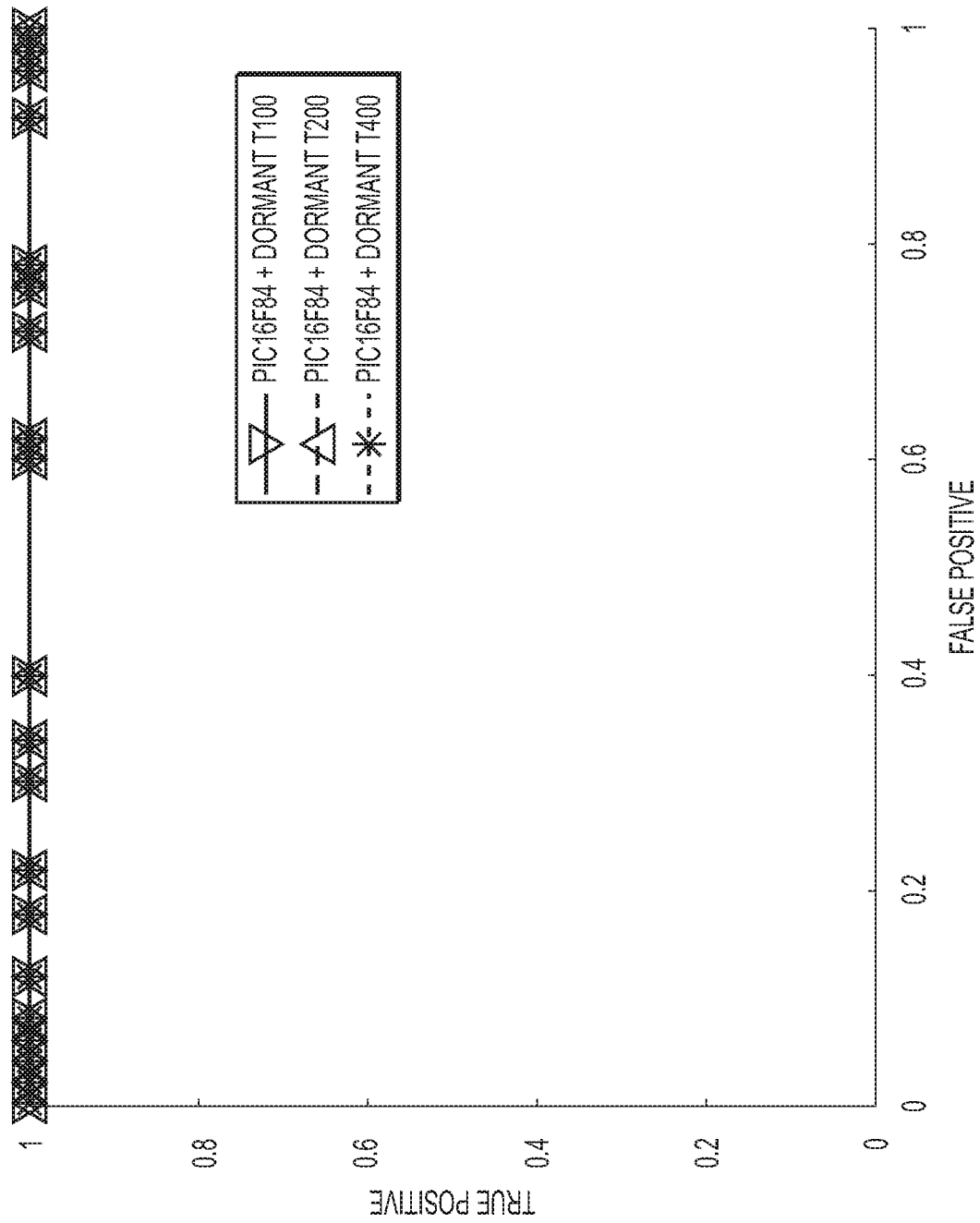
FIG. 26 is a set of example ROC curves for different Trojans on PIC16F84 circuit.

The results in FIGS. 25 and 26 show the ratios of harmonics and ROC curve, respectively. The results show that the embodiments can detect each of these three Trojans with 100% accuracy and 0% false positives.

Figure 27:
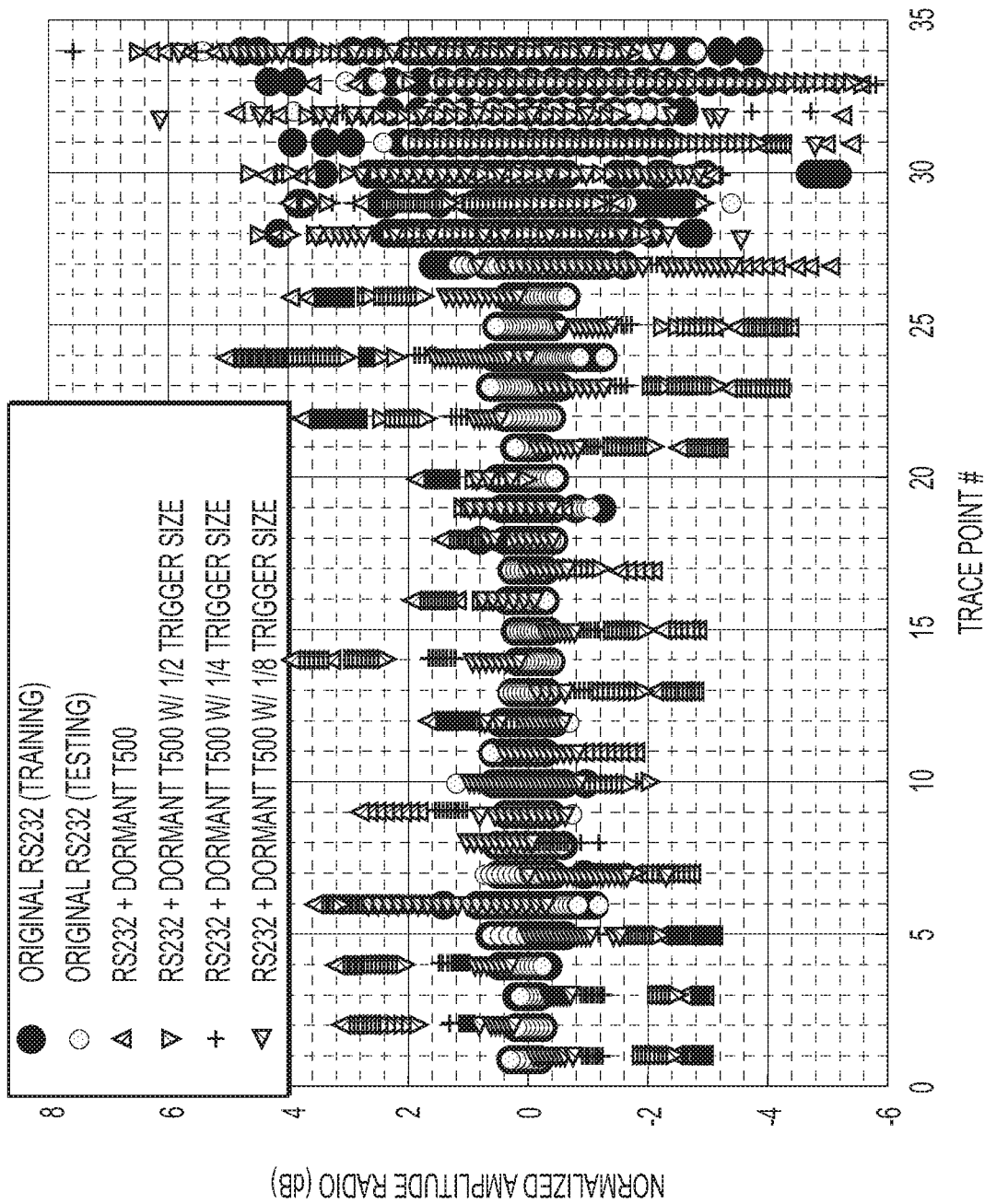
FIG. 27 is an example plot of normalized amplitude ratios for different trigger size.
Figure 28:
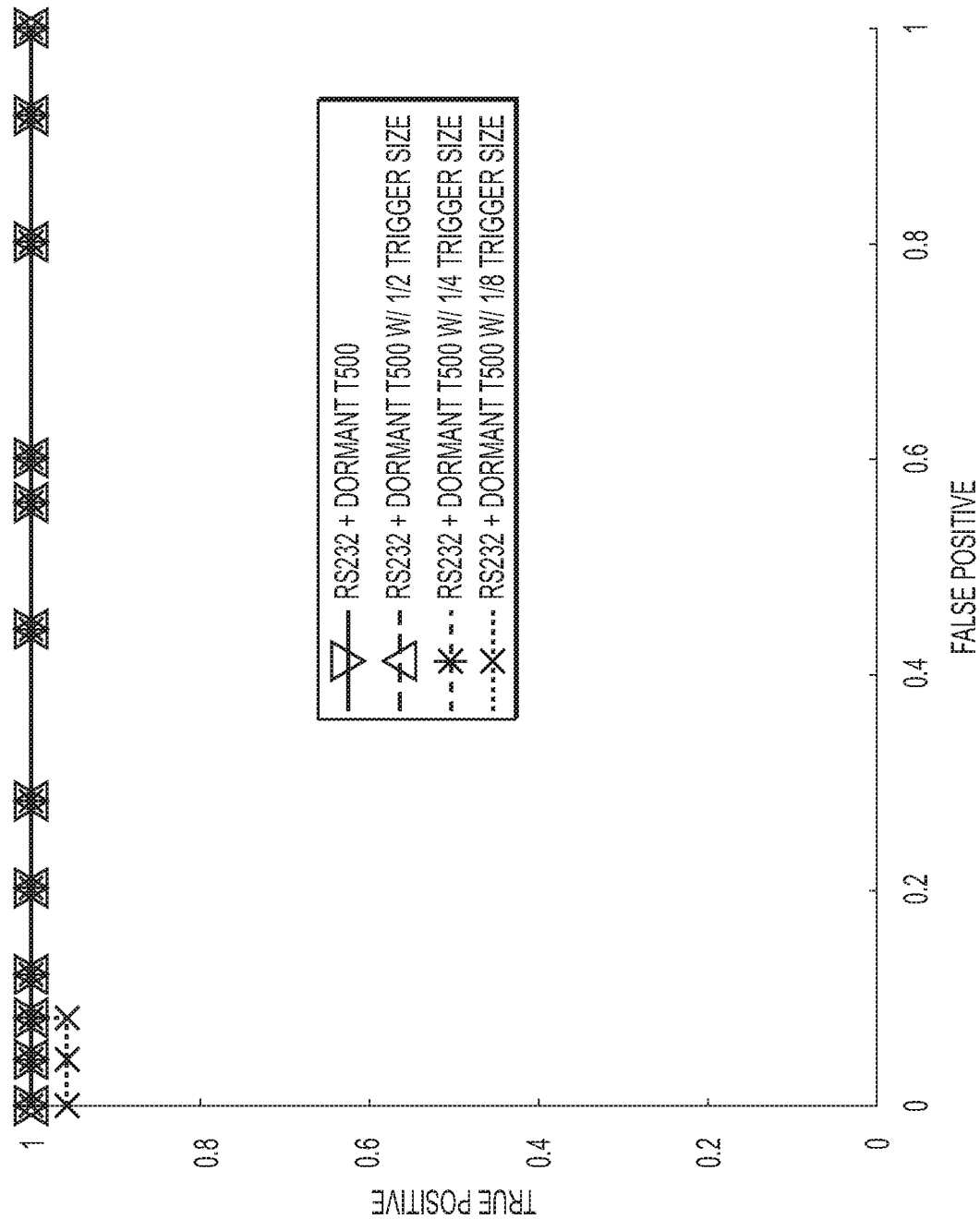
FIG. 28 is a set of example ROC curves for different trigger size.

2) PIC16F84 circuit: The embodiments use PIC16F84-T100, PIC16F84-1200, and PIC16F84-T400 hardware Trojan benchmarks from TrustHub [39]. For all three HTs, the original ITT-free design is PIC 16F84 circuit, a RISC micro-controller whose functions and instruction set are very similar to those of the Microchip 16F84 chip.

a) PIC 16F84-T100: Once activated by its (sequential) trigger circuit, the payload changes the address to PIC16F84's program memory (causing denial of service). The size of the trigger circuit is 1.34%, while the size of the payload circuit is 1.81% of the size of the PIC16F84 circuit.

b) PIC16F84-1200: Once activated by its (sequential) trigger circuit, the payload in this HT replaces the instruction register with a sleep command (causing denial of service). The size of the trigger circuit is 1.35%, and the size of the payload circuit is 1.93% of the size of the PIC16F84 circuit.

c) PIC16F84-T400: Once activated by its (sequential) trigger circuit, the payload of this HT changes the address lines to the external EEPROM to O (causing denial of service). The size of the trigger circuit is 1.35%, while the size of the payload circuit is 1.75% of the size of the PIC 16F84 circuit. The results in FIGS. 27 and 28 show the ratios of harmonics and ROC curve, respectively. The results show that the embodiments can detect each of these three Trojans with 100% accuracy and 0% false positives.

3) Trigger Size Experiment: As discussed in Section V-D, trigger size has a significant effect on dormant-HT detectability. The embodiments chose RS232-T500 for this experiment because its trigger consists of monitoring the executed instruction stream, counting occurrences of a specific instruction until a threshold value is reached (and then activating the payload), The counter's size can be changed without affecting/changing the overall functionality of the HT. Counterfeit ICs, i.e., ICs that are misrepresented in terms of their origin or quality, have been a major concern in IC supply chain because IC counterfeiting infringes on the legitimate producer's intellectual property rights and, more The reduced-trigger variants of this Trojan by reducing the number of bit of the counter.

The embodiments have the following design:

a) RS232+Dormant T500: The size of the trigger is 1.67% of the size of the original RS232 circuit.

b) RS232+Dormant T500 w/½ Trigger: The size of the trigger circuit is 1% of the size of the original RS232 circuit.

c) RS232+Dormant T500 w/¼ Trigger: The size of the trigger circuit is 0.67% of the size of the original RS232 circuit.

c) RS232+Dormant T500 w/⅛ Trigger: The size of the trigger circuit is 0.33%, of the size of the original RS232 circuit.

Figure 29:
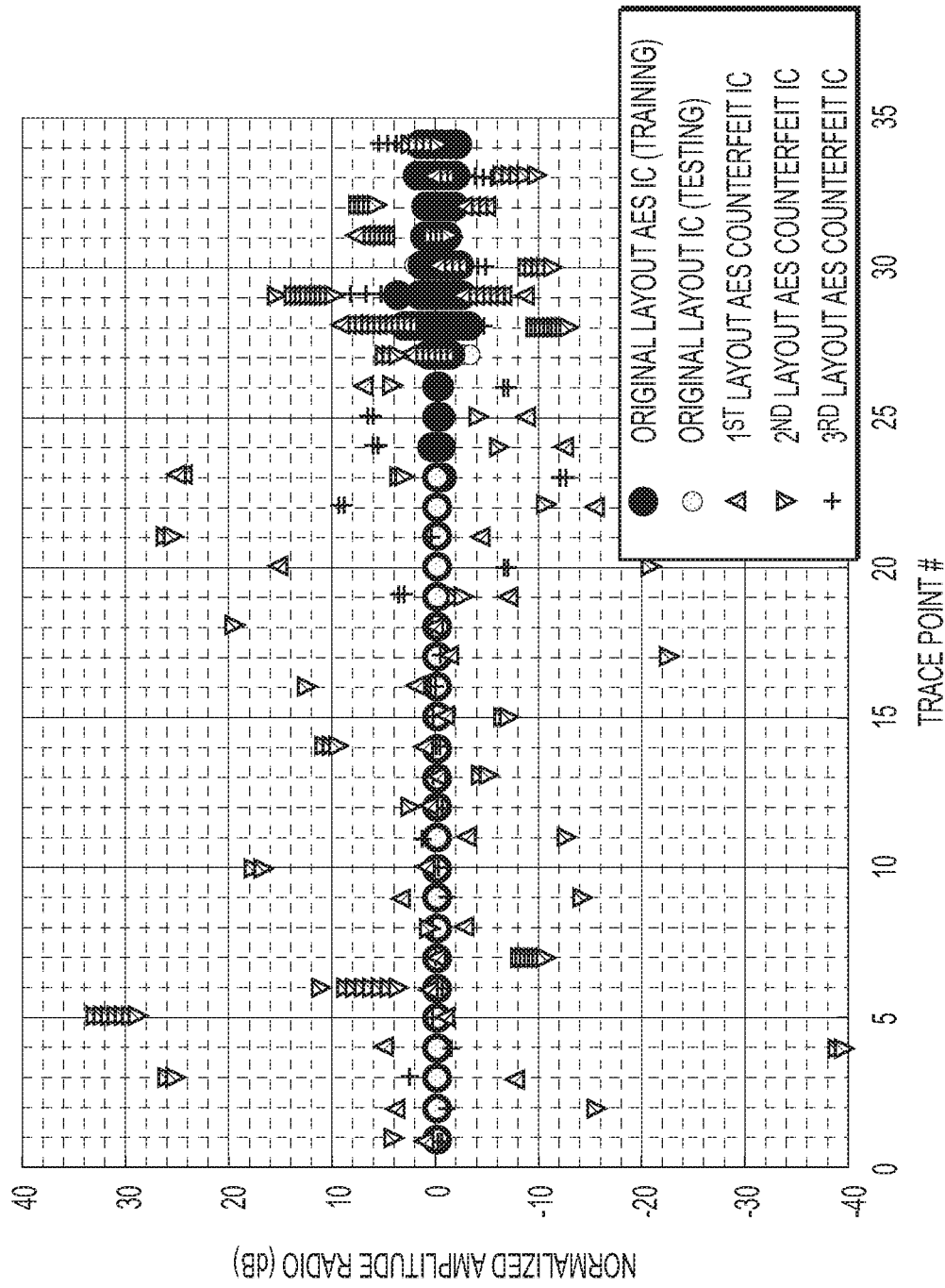
FIG. 29 is an example plot of normalized amplitude ratios for different counterfeit layouts.
Figure 30:
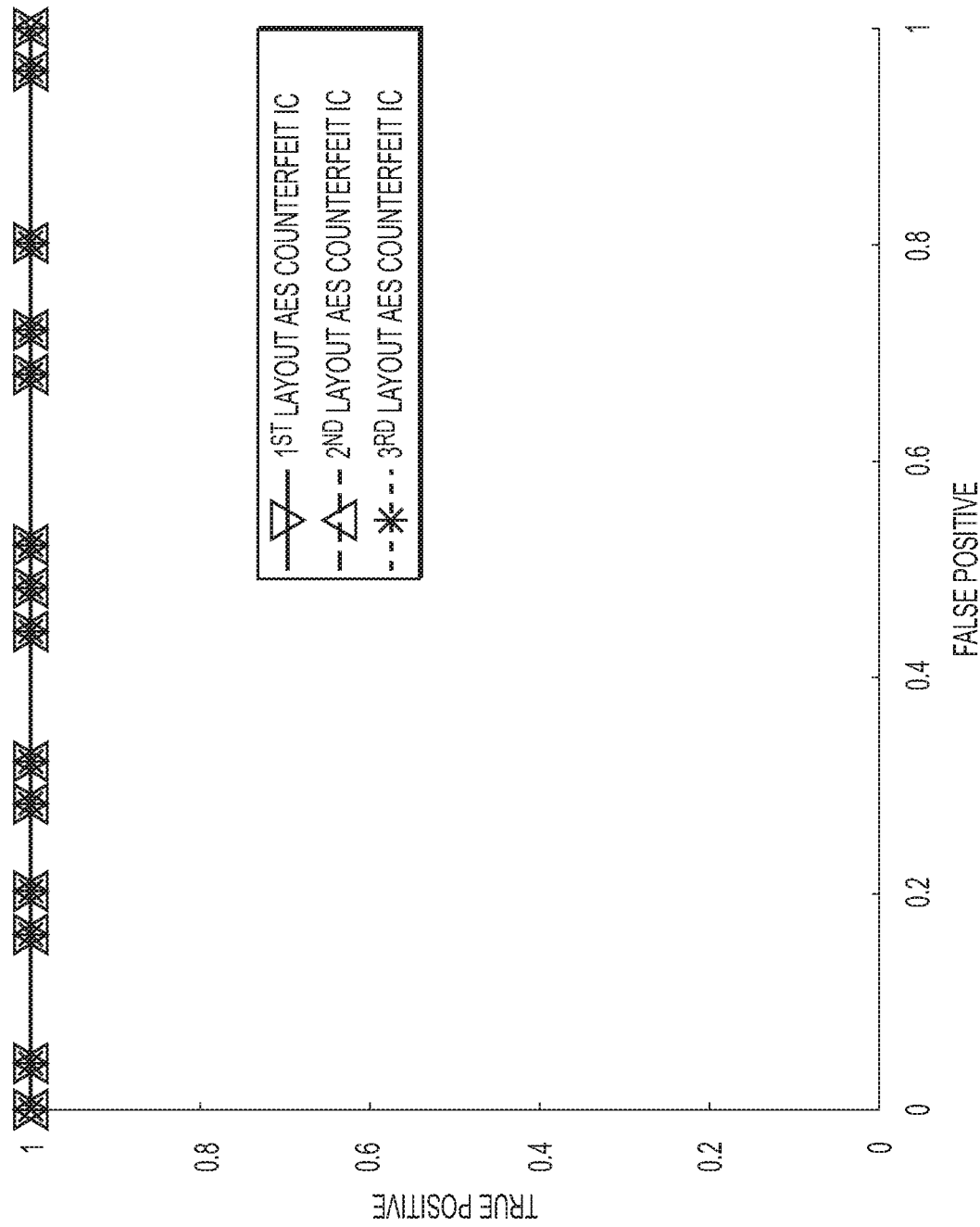
FIG. 30 is an example set of ROC curves for detection of different counterfeit IC layouts.

For all four of these variants the payload circuit remains unchanged, and its size is 1.48% of the original RS232 circuit's size. The results in FIG. 29 and FIG. 30 show that the smaller the trigger is, the harder it is to detect the Trojan, which agrees with the previous results for AES-based HTs. Counterfeit ICs, i.e. ICs that are misrepresented in terms of their origin or quality, have been a major concern in IC supply chain because IC counterfeiting infringes on the legitimate producer's intellectual property rights and, more importantly for the end user, counterfeit ICs often have inferior specifications and quality, and may thus represent a hazard if incorporated into critical systems such as aircraft systems, life support, military equipment, or space vehicles [40]. In this section, the embodiments evaluate the new backscattering side channel's suitability for detection of IC counterfeits that have a design which is not identical to the legitimate IC, i.e. the embodiments do not consider counterfeits where a legitimate IC is relabeled to misrepresent its speed grade, new-vs-recycled status, etc.

Specifically, for the experiments, the embodiments implement two different kinds of counterfeit IC: 1) Counterfeit ICs with the same functionality as the original but different physical implementation (position) of the circuit, and 2) Counterfeit ICs with the same functionality and position as the original but different physical layout (routing and placement) of the circuit.

Figure 31:
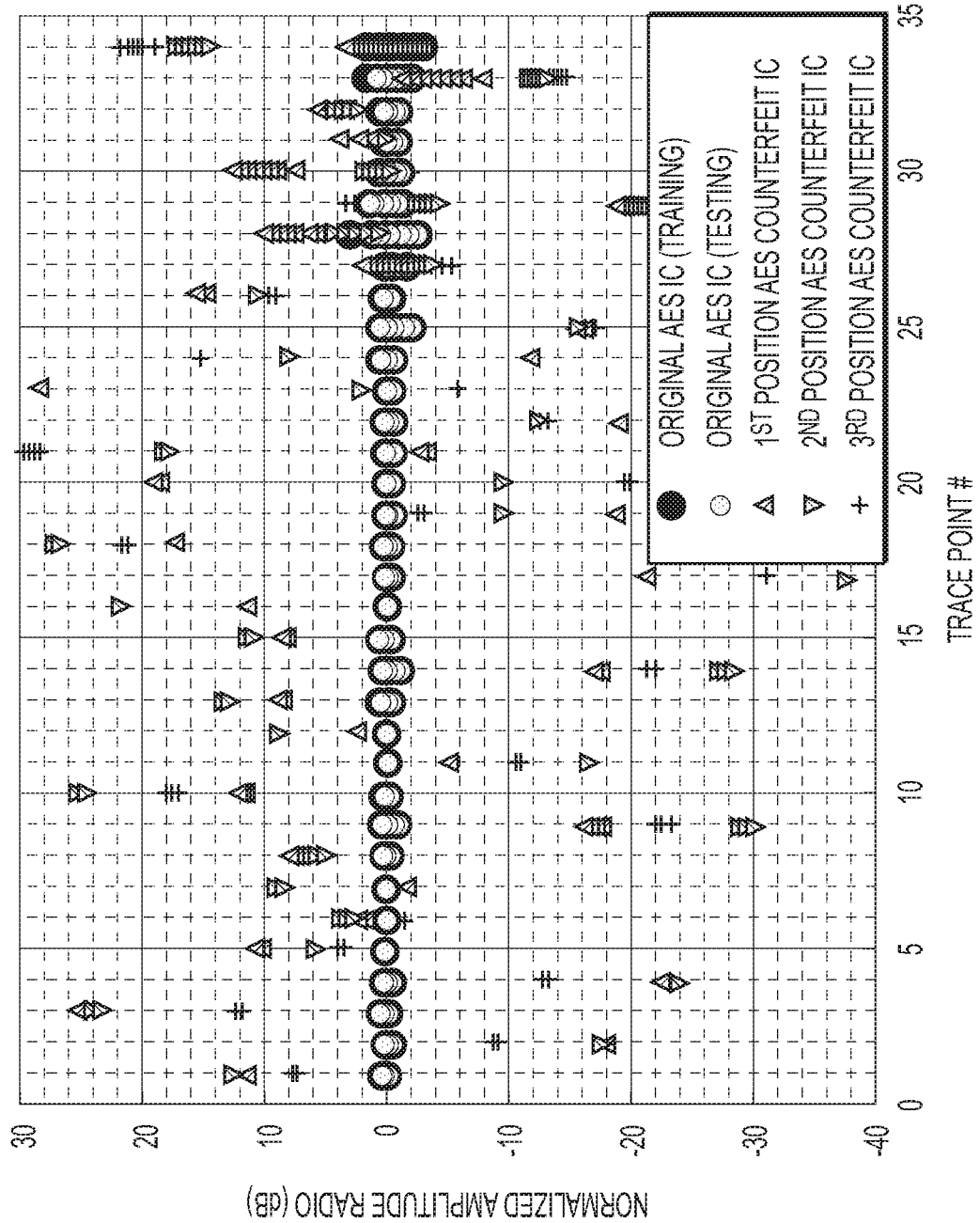
FIG. 31 is an example plot of normalized amplitude ratios for counterfeit IC whose local layout is the same, but position on the chip is changed, relative to the original IC.
Figure 32:
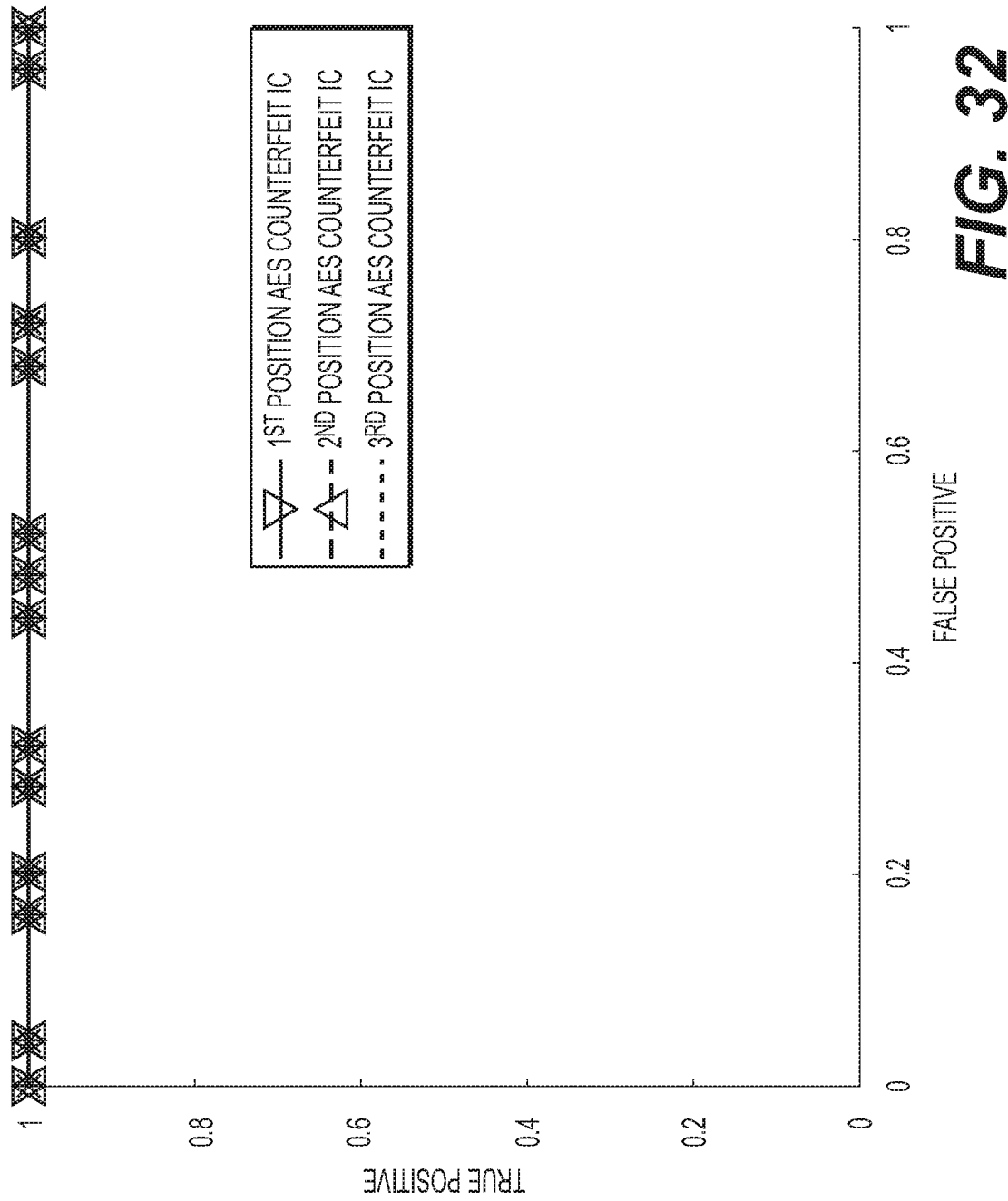
FIG. 32 is an example set of ROC curves for detection of counterfeit ICs whose local layout is the same, but position on the chip is changed, relative to the original IC.

1) Counterfeit ICs with Different Layout: The embodiments have implemented several counterfeit IC examples by re-compiling and using the EDA tool to change the placement and routing of the circuit. The embodiments have four different test subject designs: Original layout AES IC, 1st layout AES counterfeit IC, 2nd layout AES counterfeit IC, 3rd layout AES counterfeit IC. The results in FIGS. 31 and 32 show the ratios of harmonics and ROC curve, respectively. The results show that the counterfeit ICs can be easily detected (with no false positives).

2) Counterfeit ICs with Changed Position: The embodiments have implemented several counterfeit IC examples by moving the placement of the AES circuit from its original placement. The embodiments have four different test subject designs: original position AES IC, 1st position AES counterfeit IC, 2nd position AES counterfeit IC, and 3rd position AES counterfeit IC. The embodiments use the same technique to detect these counterfeit ICs. The results in FIGS. 31 and 32 show the ratios of harmonics and ROC curve, respectively. The results show that the embodiments can easily detect all of these counterfeit ICs designs (with no false positives).

In one sense, this disclosure describes a backscattering side channel that is created by transmitting a signal toward the IC, where the internal impedance changes caused by on-chip switching activity modulate the signal that is back-scattered (reflected) from the IC, To demonstrate how this new side-channel can be used to detect small changes in circuit impedances, the embodiments propose a new method for nondestructively detecting HTs from outside of the chip. The embodiments experimentally confirm, using measurements on one physical instance for training and nine other physical instances for testing, that the new side-channel, when combined with an HT detection method, allows detection of a dormant HT in 100% of the HT-afflicted measurements for a number of different HTs, while producing no false positives in HT-free measurements. Furthermore, additional experiments are conducted to compare the backscattering-based detection to one that uses the traditional EM-emanation-based side channel. These results show that backscattering-based detection outperforms the EM side channel, confirms that dormant HTs are much more difficult for detection than His that have been activated, and shows how detection is affected by changing the HT's size and physical location on the IC.

System embodiments of this disclosure include a system for detecting hardware Trojans in a computerized device, and the system includes a digital circuit having switching components operating pursuant to at least one clock frequency, the digital circuit positioned within an interrogation range of an incident carrier wave. A backscatter response reflects from the digital circuit upon arrival of the incident carrier wave, wherein the backscatter response is a modulated backscatter response in the presence of the switching operations. A detection device is positioned to receive the backscatter response, and a computer is connected to the detection device, the computer identifying characteristics of the backscatter response indicating a presence or an absence of a hardware Trojan within or connected to the digital circuit. A computer according to this disclosure includes hardware and software to provide the time based and frequency based analysis described above as well as processors to calculate data from the backscatter response. The characteristics identified are frequency bands within the backscatter response, and the bands correspond to side-band harmonics of the respective clock frequency $f_{clock}$ around the frequency of an incident carrier wave $f_{carrier}$. The system includes the digital circuit that implements the backscatter response in the absence of design modifications to the digital circuit (i.e., the system requires no after-market changes to circuits and devices under test). The presence of a hardware Trojan is indicated by the computer comparing the characteristics of the received backscatter response to a reference backscatter response that corresponds to a baseline circuit free of hardware Trojans. The reference backscatter response may be a digital version of a simulated backscatter response expected from the baseline circuit digitally modeled as free of hardware Trojans. In certain embodiments, respective amplitudes of sequential harmonics in the received backscatter response differ from corresponding amplitudes of the simulated backscatter response of the baseline circuit. In certain embodiments, the digital circuit includes a microprocessor, microcontroller, or another software-programmable computer component such as a field programmable gate array or at least one application specific integrated circuit (ASIC).

In another embodiment, a system for detecting hardware Trojans in a computerized device includes a digital circuit having at least one clock connected to switching components that exhibit respective output impedances, wherein the at least one clock has a respective clock frequency $f_{clock}$. A respective radar cross section response is exhibited at each of the switching components, wherein updated output impedances modulate the respective radar cross sections. A computerized detection device includes a detection processor and detection software, the computerized detection device positioned to receive modulated radar cross sections from the digital circuit, wherein the computerized detection device uses the detection processor for quantifying the modulated radar cross sections in the frequency domain and generating reflected data. The computerized detection device identifies characteristics of the backscatter response indicating a presence or an absence of a hardware Trojan within or connected to the digital circuit. The modulations of respective radar cross sections correspond to an input carrier wave having a carrier frequency of $f_{carrier}$ and directed to the digital circuit in a wireless transmission, and the harmonics of the clock frequency are located at $f_{carrier}+/-k*f_{clock}$, where k is an integer greater than zero.

This disclosure includes implementations of systems, methods and computer program products according to various implementations of the present invention. In this regard, each block of a flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially, concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

Any combination of one or more computer readable medium(s) may be used to implement the systems and methods described hereinabove. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by claims herein.

REFERENCES

[1] K. Xiao, D. Forte, Y. En, R. Karri, S. Bhunia, and M. Tehranipoor, "Hardware Trojans: Lessons learned after one decade of research," *ACM Transactions on Design Automation of Electronic Systems (TODAES)*, vol. 22, no. I, p. 6, 2016.

[2] W. K. Clark and P. L. Levin, "Securing the information highway," *Foreign. Aff.*, vol. 88, p. 2, 2009.

[3] J. Villasenor, Compromised by design?: Securing the defense electronics supply chain. *Center for Technology Innovation ac Brookings*, 2013.

[4] "The hacker in your hardware," *Scientific American*, vol. 303, no. 2, pp. 82-87, 2010.

[5] L. W. Kim, J D. Villasenor et al., "A Trojan-resistant system-on-chip bus architecture," in *Military Communications Conference, 2009. MILCOM 2009. IEEE. IEEE*, 2009, pp. 1-6.

[6] Q. Yu and J. Frey, "Exploiting error control approaches for hardware Trojans on network-on-chip links," in Defect and Fault Tolerance in VLSI and Nanotechnology Systems (DFT). 2013 *IEEE International Symposium 011. IEEE*, 2013, pp. 266-271.

[7] D. McIntyre, F. Wolff, C. Papachristou, S. Bhunia, and D. Weyer, "Dynamic evaluation of hardware trust," in Hardware-Oriented Security and Trust, 2009. HOST'09. *IEEE International Workshop on IEEE*, 2009, pp. 108-111.

[8] L.-W. Kim and J. D. Villasenor, "Dynamic function replacement for system-on-chip security in the presence of hardware-based attacks," *IEEE Transactions on Reliability*, vol. 63, no. 2, pp. 661-675, 2014.

[9] R. Torrance and D. James, "The state-of-the-art in IC reverse engineering," in Cryptographic Hardware and Embedded Systems-CHES 2009. *Springer,* 2009, pp. 363-381.

[10] A. Waksman, M. Suozzo, and S. Sethumadhavan, "Fanci: identification of stealthy malicious logic using boolean functional analysis," in *Proceedings of the 2013 ACM SIGSAC conference on Computer & Communications Security. ACM*, 2013, pp. 697-708.

[11] H. Salmani, "Cotd: reference-free hardware Trojan detection and recovery based on controllability and observability in gate-level netlist," *IEEE Transactions 011 Information Forensics and Security*, vol. 12, no. 2, pp. 338-350, 2017.

[12] J. Zhang, F. Yuan, L. Wei, Y. Liu, and Q. Xu. "Veritrust: Verification for hardware crust," *IEEE Transactions on Computer-Aided Design of Integrated Circuits and Systems*, vol. 34, no. 7, pp. 1148-1161, 2015.

[13] M. Tehranipoor and F. Koushanfar, "A survey of hardware Trojan taxonomy and detection," *IEEE design & test of computers.* vol. 27. no. I, 2010.

[14] R. S. Chakraborty, S. Narasimhan, and S. Bhunia, "Hardware Trojan: Threats and emerging solutions," in High Level Design. Validation and Test Workshop, 2009. *HLDVT* 2009. *IEEE International IEEE,* 2009, pp. 166-171.

[15] D. Agrawal, S. Baktir, D. Karakoyunlu, P. Rohatgi, and B. Sunar, "Trojan detection using is fingerprinting," in Security and Privacy, 2007. *SP'07. IEEE Symposium on. IEEE,* 2007, pp. 296-310.

[16] M. Banga and M. S. Hsiao, "A region based approach for the identification of hardware Trojans," in Hardware-Oriented Security and Trust, 2008. HOST 2008. *IEEE International Workshop on. IEEE,* 2008, pp. 40-47.

[17] "Vitamin: Voltage inversion technique lo ascertain malicious insertions in ics," 2009.

[18] C. He. B. Hou. L. Wang, Y. En, and S. Xie, "A failure physics model for hardware Trojan detection based on frequency spectrum analysis," in Reliability Physics Symposium (IRPS), 2015 *IEEE International. IEEE,* 2015, pp. PR-I.

[19] S. Narasimhan, D. Du, R. S. Chakraborty, S. Paul, F. Wolff, C. Papachristou, K. Roy, and S. Bhunia, "Multiple-parameter side-channel analysis: A non-invasive hard-

[20] C. Bao, D. Forte, and A. Srivastava, "Temperature tracking: Toward robust run-time detection of hardware Trojans," *IEEE Transactions on Computer-Aided Design of 111 regrated Circuits and Systems*, vol. 34, no. 10, pp. 1577-1585, 2015.

[21] D. Forte, C. Bao, and A. Srivastava, "Temperature tracking: An innovative run-time approach for hardware Trojan detection," in *Proceedings of the International Conference on Computer-Aided Design*. IEEE Press, 2013, pp. 532-539.

[22] J. He, Y. Zhao, X. Guo. and Y. Jin, "Hardware Trojan detection through chip-free electromagnetic side-channel statistical analysis," *IEEE Transactions on Very Large Scale Integration (VLSI) Systems*, vol. 25, no. JO, pp. 2939-2948, 2017.

[23] J. Balasch, B. Gierlichs, and I. Verbauwhede, Electromagnetic circuit fingerprints for hardware Trojan detection," in Electromagnetic Compatibility (EMC), 2015 *IEEE International Symposium on. IEEE*. 2015, pp. 246-251.

[24] X. T. Ngo. Z. Najm, S. Bhasin, S. Guilley. and J. L. Danger. "Method taking into account process dispersion to detect hardware Trojan horse by side-channel analysis," *Journal of Cryptographic Engineering* vol. 6, no. 3. pp. 239-247, 2016.

[25] K. Hu, A. N. Nowroz, S. Reda, and F. Koushanfar, "High-sensitivity hardware Trojan detection using multimedia characterization," in *Proceedings of the Conference on Design, Automation, and Test in Europe. EDA Consortium*, 2013. pp. 1271-1276.

[26] A. N. Nowroz, K. Hu, F. Koushanfar, and S. Reda, "Novel techniques for high-sensitivity hardware Trojan detection using thermal and power maps." *IEEE Transactions on Computer-Aided Design of Integrated Circuits and Systems*, vol. 33, no. 12, pp. 1792-1805, 2014.

[27] B. Cha and S. K. Gupta, "Efficient Trojan detection via calibration of process variations," in Test Symposium (ATS). 2012 *IEEE 21st Asian. IEEE*. 2012, pp. 355-361.

[28] "Trojan detection via delay measurements: A new approach to select paths and vectors to maximize effectiveness and minimize cost," in *Proceedings of the Conference on Design, Automation and Test in Europe. EDA Consortium*, 2013, pp. 1265-1270.

[29] M. Lecomte, J. Fournier, and P. Maurine, "An on-chip technique to detect hardware Trojans and assist counterfeit identification," *IEEE Transactions on Very Large Scale Integration (VLSI) Systems*, vol. 25, no. 12, pp. 3317-3330, 2017.

[30] P. V. Nikitin and K. S. Rao, "Theory and measurement of backscattering from rfid tags." *IEEE Antennas and Propagation Magazine* vol. 48, no. 6, pp. 212-218, 2006.

[31] B. Shakya, T. He, H. Salmani, D Forte, S. Bhunia, and M. Tehranipoor, "Benchmarking of hardware Trojans and maliciously affected circuits," *Journal of Hardware and Systems Security* no. 1, pp. 85-102, 2017.

[32] S. Bhunia, M. S. Hsiao, M. Banga, and S. Narasimhan, "Hardware Trojan attacks: threat analysis and countermeasures," *Proceedings of the IEEE*, vol. 102. no. 8, pp. 1229-1247, 2014.

[33] J. Zhang, F. Yuan, and Q. Xu, "Detrust: Defeating hardware trust verification with stealthy implicitly-triggered hardware Trojans," in *Proceedings of the 2014 ACM SIGSAC Conference on Computer and Communications Security. ACM*, 2014, pp. 153-166.

[34] Z. Chen, X. Guo, R. Nagesh, A. Reddy, M. Gora, and A. Maiti, "Hardware Trojan designs on basys fpga board," *Embedded system challenge contest in cyber security awareness week-CSAW*, 2008.

[35] R. S. Chakraborty, I. Saha, A. Palchaudhuri, and G. K. Naik, "Hardware Trojan insertion by direct modification of fpga configuration bit stream," *IEEE Design & Test*, vol. 30, no. 2, pp. 45-54, 2013.

[36] X. Wang, M. Tehranipoor, and J. Plusquellic, "Detecting malicious inclusions in secure hardware: Challenges and solutions," in Hardware Oriented Security and Trust, 2008. HOST 2008. *IEEE International Workshop on. IEEE*, 2008, pp. 15-19.

[37] R. Karri, J. Rajendran, K. Rosenfeld, and M. Tehranipoor, "Trustworthy hardware: Identifying and classifying hardware Trojans." *Computer*, vol. 43, no. 10, pp. 39-46, 2010.

[38] J. M. Rabaey, A. P. Chandrakasan, and B. Nikolic, Digital Integrated Circuits. *Prentice Hall Englewood Cliffs*, 2002, vol. 2.

[39] "Trusthub." http://www.tlust-hub.org/benchmarks/Trojan.

[40] U. Guin, K. Huang, D. DiMase, J. M. Carulli, M. Tehranipoor, and Y. Makris, Counterfeit Integrated Circuits: A rising threat in the global semiconductor supply chain," *Proceedings of the IEEE*. vol. 102, no. 8, pp. 1207-1228, 2014.

The invention claimed is:

1. A system for detecting hardware Trojans in a computerized device, the system comprising:

a digital circuit comprising switching components operating pursuant to at least one clock frequency, the digital circuit positioned within an interrogation range of an incident radio frequency (RF) carrier wave;

a backscatter response reflected from the digital circuit upon arrival of the incident radio frequency (RF) carrier wave, wherein the backscatter response is a modulated backscatter response in the presence of the switching operations;

a detection device positioned to receive the backscatter response; and a computer connected to the detection device, the computer identifying characteristics of the backscatter response indicating a presence or an absence of a hardware Trojan within or connected to the digital circuit;

wherein the characteristics identified are frequency bands within the backscatter response, said bands corresponding to side-band harmonics of the respective clock frequency $f_{clock}$ around the frequency of the incident radio frequency (RF) carrier wave $f_{carrier}$, wherein harmonics of the clock frequency are located at $f_{carrier}+/-k*f_{clock}$, where k is an integer greater than zero.

2. The system of claim 1, wherein the digital circuit implements the backscatter response in the absence of design modifications to the digital circuit.

3. The system of claim 1, wherein the digital circuit implements the backscatter response in the absence of added analog elements operated to modulate the reflected response.

4. The system of claim 1, wherein the characteristics of the harmonics comprise respective amplitudes of a plurality of sequential harmonics.

5. The system of claim 1, wherein the presence of a hardware Trojan is indicated by the computer comparing the characteristics of the received backscatter response to a reference backscatter response that corresponds to a baseline circuit free of hardware Trojans.

6. The system of claim 5, wherein the reference backscatter response is a digital version of a simulated backscatter response expected from the baseline circuit digitally modeled as free of hardware Trojans.

7. The system of claim 6, wherein respective amplitudes of sequential harmonics in the received backscatter response differ from corresponding amplitudes of the simulated backscatter response of the baseline circuit.

8. The system of claim 1, wherein said digital circuit comprises a field programmable gate array.

9. The system of claim 1, wherein said digital circuit comprises at least one application specific integrated circuit (ASIC).

10. The system of claim 1, wherein said digital circuit comprises a microprocessor, microcontroller, or another software-programmable computer component.

11. A system for detecting hardware Trojans in a computerized device comprising:
a digital circuit comprising at least one clock connected to switching components that exhibit respective output impedances, wherein the at least one clock has a respective clock frequency $f_{clock}$;
a respective radar cross section response exhibited at each of the switching components, wherein updated output impedances modulate the respective radar cross sections;
a computerized detection device comprising a detection processor and detection software, the computerized detection device positioned to receive modulated radar cross sections from the digital circuit,
wherein the computerized detection device uses the detection processor for quantifying the modulated radar cross sections in the frequency domain and generating reflected data; and
wherein the computerized detection device identifies characteristics of the backscatter response indicating a presence or an absence of a hardware Trojan within or connected to the digital circuit;
wherein the modulations of respective radar cross sections correspond to an input radio frequency (RF) carrier wave having a carrier frequency of $f_{carrier}$ and directed to the digital circuit in a wireless transmission, and the harmonics of the clock frequency are located at $f_{carrier}+/-k*f_{clock}$, where k is an integer greater than zero.

12. The system of claim 11, wherein said digital circuit is formed in an application specific integrated circuit (ASIC).

13. The system of claim 11, wherein said digital circuit comprises a field programmable gate array.

14. The system of claim 11, wherein said digital circuit comprises a microprocessor, microcontroller, or another software-programmable computer component.

* * * * *